US010371944B2

(12) United States Patent
Mallinson

(10) Patent No.: US 10,371,944 B2
(45) Date of Patent: Aug. 6, 2019

(54) VIRTUAL REALITY HEADSET WITH SEE-THROUGH MODE

(71) Applicant: Sony Interactive Entertainment Inc., Tokyo OT (JP)

(72) Inventor: Dominic Mallinson, San Mateo, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 14/338,326

(22) Filed: Jul. 22, 2014

(65) Prior Publication Data

US 2016/0025978 A1 Jan. 28, 2016

(51) Int. Cl.
*G02B 27/01* (2006.01)
*G02B 27/00* (2006.01)

(52) U.S. Cl.
CPC ....... *G02B 27/0172* (2013.01); *G02B 27/017* (2013.01); *G02B 27/0093* (2013.01); *G02B 2027/0118* (2013.01); *G02B 2027/0178* (2013.01); *G02B 2027/0187* (2013.01); *G02B 2027/0196* (2013.01)

(58) Field of Classification Search
CPC ............ G02B 27/0172; G02B 27/0093; G02B 2027/0178; G02B 2027/0196; G02B 27/01; G02B 27/0101; G02B 27/0132; G02B 27/017; G02B 27/0179; G02B 2027/0161; G02B 2027/0163
USPC ............................................................. 345/8
See application file for complete search history.

(56) References Cited

U.S. PATENT DOCUMENTS

| | | | | |
|---|---|---|---|---|
| 8,657,438 B2 * | 2/2014 | Jacobs | G02B 26/026 351/49 |
| 9,158,115 B1 * | 10/2015 | Worley | G02B 27/0172 |
| 2003/0058371 A1 * | 3/2003 | Blackham | H04N 5/66 348/756 |
| 2004/0108971 A1 * | 6/2004 | Waldern | G02B 27/0093 345/8 |

(Continued)

FOREIGN PATENT DOCUMENTS

| | | |
|---|---|---|
| JP | H06 326945 A | 11/1994 |
| WO | WO2013155217 A1 | 10/2013 |

OTHER PUBLICATIONS

ISR PCT/US2015/039144, dated Sep. 9, 2015, 2 pages.

*Primary Examiner* — Jason M Mandeville
(74) *Attorney, Agent, or Firm* — Penilla IP, APC

(57) ABSTRACT

Systems and method for providing a see-through screen in a head-mounted display (HMD) includes a display screen having a front side and a back side. The display screen is configured for rendering media content. First optics is provided adjacent to the front side of the display screen and configured to provide a focus for viewing the media content. A shutter screen is provided adjacent to the backside of the display screen and is switchable between an opaque mode and a transparent mode. Second optics is provided behind the shutter screen such that the shutter screen is between the display screen and the second optics. The second optics provides an adjustment to the focus to allow clear view through the first optics, the display screen, the shutter screen and the second optics, when the transparent mode is activated on the shutter screen.

21 Claims, 14 Drawing Sheets

(56) References Cited

U.S. PATENT DOCUMENTS

| | | | | |
|---|---|---|---|---|
| 2008/0068520 | A1* | 3/2008 | Minikey, Jr. | B60R 1/12 349/11 |
| 2011/0096100 | A1* | 4/2011 | Sprague | G02B 27/286 345/690 |
| 2012/0050141 | A1* | 3/2012 | Border | G02B 27/017 345/8 |
| 2012/0154557 | A1* | 6/2012 | Perez | H04N 21/25891 348/53 |
| 2012/0206452 | A1* | 8/2012 | Geisner | G02B 27/017 345/419 |
| 2013/0021226 | A1* | 1/2013 | Bell | G02B 3/0006 345/8 |
| 2013/0068913 | A1* | 3/2013 | Bouissiere | F16M 13/02 248/493 |
| 2013/0335546 | A1 | 12/2013 | Crane et al. | |
| 2014/0168783 | A1* | 6/2014 | Luebke | G02B 3/0006 359/630 |
| 2014/0320399 | A1* | 10/2014 | Kim | G02B 27/017 345/156 |
| 2015/0332502 | A1* | 11/2015 | Seen | G06T 19/006 345/633 |

* cited by examiner

VIRTUAL REALITY HEADSET WITH SEE-THROUGH MODE

BACKGROUND

1. Field of the Invention

The present invention relates to headsets used for viewing media content and more particularly, headsets with see-through mode.

2. Description of the Related Art

The computing industry and the video game industry have seen many changes over the years. As computing power has expanded, developers of video games have created game software that have adapted to the increased computing power. To this end, video game developers have been coding games that incorporate sophisticated operations and mathematics to produce a very realistic game experience.

These games are presented as part of a gaming system including game consoles, portable game devices, and/or provided as services over a server or the cloud. As is well known, the game console is designed to connect to a monitor (usually a television) and enable user interaction through handheld controllers/input devices. A game console may include specialized processing hardware, including a CPU, a graphics processor for processing intensive graphics operations, a vector unit for performing geometric transformations, and other glue hardware, firmware, and software. The game console may be further designed with an optical disc tray for receiving game compact discs for local play through the game console. Online gaming is also possible, where a user can interactively play against or with other users over the Internet. As game complexity continues to intrigue players, game and hardware manufacturers have continued to innovate to enable additional and more realistic interactivity.

A growing trend in the computer gaming industry is to develop games that increase the interaction between the user and the gaming system. One way of accomplishing a richer interactive experience is to use wireless game controllers whose movement and gestures are tracked by the gaming system. These movements and gestures are used as inputs for the game. Gesture inputs, generally speaking, refer to having an electronic device such as a computing system, video game console, smart appliance, etc., react to some gesture made by the user while playing the game that are captured by the electronic device.

Another way of accomplishing a more immersive interactive experience is to use a head-mounted display. A head-mounted display is worn by the user and can be configured to present various graphics, such as a view of a virtual space, in a display portion of the HMD. The graphics presented on a head-mounted display can cover a large portion or even all of a user's field of view. Hence, a head-mounted display can provide an immersive experience to the user.

The display screens in most head-mounted display are opaque so as to provide a clear view of the virtual reality when the user is in "immersive" mode. In such head-mounted displays, the view of the outside/real world is blocked when rendering virtual reality media content. The blocked view makes it hard for users to pick up a controller, pick up a cell phone, detect a movement in the real-world, etc. Of course the easiest solution is for the user to remove the HMD so that the user can view the real-world. This would require the user who is completely immersed in the virtual reality to re-orient himself/herself to view the real-world.

It is in this context that embodiments of the invention arise.

SUMMARY

Embodiments of the present invention provide methods and systems for providing a fully transparent display screen within head mounted displays (HMDs) to allow viewing through the display screen. The display screen includes an enhanced optical system that allows an un-distorted view of the real-world while the user is wearing the HMD. The enhanced optical system includes a second set of optics disposed on an outer side of the display screen. The second set of optics include a focus that is configured to correct a focus provided by a first set of optics disposed in front of a display screen so as to allow a clear view of an external environment. Additionally, a shutter screen is provided behind the display screen. The shutter screen is switchable between a transparent mode and an opaque mode. When the HMD is engaged in a transparent mode, the light from the external environment is allowed through. When the HMD is engaged in an "immersive" mode, an opaque mode is activated, wherein light from the external environment is blocked from entering. Thus, when the shutter screen is in a transparent mode, real-world view of the external environment is visible through the HMD and when the shutter screen is in the opaque mode, media content is rendered on the display screen of the HMD. It should be appreciated that the present invention can be implemented in numerous ways, such as a process, an apparatus, a system, a device or a method on a computer readable medium. Several inventive embodiments of the present invention are described below.

In one embodiment, a device is provided. The device includes a display screen having a front side and a back side. The display screen is configured for rendering media content. First optics is disposed adjacent to the front side of the display screen and is configured to provide a focus for viewing the media content when rendered on the display screen. A shutter screen is disposed adjacent to the backside of the display screen. The shutter screen is switchable between an opaque mode and a transparent mode. The opaque mode is active when the media content is viewable on the display screen. Second optics is disposed behind the shutter screen such that the shutter screen is between the display screen and the second optics. The second optics provides an adjustment to the focus to allow viewing through the first optics, the display screen, the shutter screen and the second optics when the transparent mode is activated on the shutter screen.

In another embodiment a pair of glasses is provided. The pair of glasses includes a view port. The view port is provided with a multi-layer arrangement. The multi-layer arrangement includes a first optic, a display screen, a shutter screen and a second optic. The first optic is provided with a first focus setting. The display screen is positioned behind the first optic. The display screen is transparent. The shutter screen is positioned behind the display screen. The shutter screen is adjustable between a transparent mode and an opaque mode. The second optic is provided with a second focus setting. The second optic is provided behind the shutter screen such that the shutter screen is between the display screen and the second optic. The second focus setting removes the first focus setting to provide a see-through view through the first optic, the display screen, the shutter screen and the second optic, when the shutter screen is set to the transparent mode.

In yet another embodiment, a method is provided. The method includes receiving media content for rendering on a display screen of a pair of glasses. The pair of glasses includes first optics in front of the display screen to provide a focus for viewing the media content that is provided for rendering on the display screen. An event is detected near the pair of glasses while the media content is being rendered. The detection causes a signal to be generated. In response to the generated signal, a transparent mode is activated in a shutter screen disposed behind the display screen. The activation causes viewing through the pair of glasses. The viewing through the pair of glasses is enabled by second optics disposed behind the shutter screen. The second optics provides a second focus that compensates for view distortion caused by the focus of the first optics.

Other aspects of the invention will become apparent from the following detailed description, taken in conjunction with the accompanying drawings, illustrating by way of example the principles of the invention.

BRIEF DESCRIPTION OF THE DRAWINGS

The invention may best be understood by reference to the following description taken in conjunction with the accompanying drawings.

FIGS. 1-1 through 1-4 illustrate various configurations of different optical components of a display screen of the HMD, in accordance with various embodiments of the invention.

FIGS. 4H-1 and 4H-2 illustrate exemplary views of a display screen rendering a window into a web portal of a website, in accordance with an embodiment of the invention.

DETAILED DESCRIPTION

In one embodiment, the systems and methods described herein provide for ways of allowing users of head mounted displays (HMDs), who may be playing a game or viewing media content to be able to view through the display screen. The display screen is equipped with an enhanced optical system that allows for transitioning portion of the display screen to allow viewing of external environment while allowing the user to view media content in the remaining portions. It will be obvious, however, to one skilled in the art, that the present invention may be practiced without some or all of these specific details. In other instances, well known process operations have not been described in detail in order not to unnecessarily obscure the present invention.

Providing see through capability in the display screen enables a user to view external environment in at least a portion of the display screen, without having to take out the HMD. The enhanced optics within the HMD provides an undistorted view of the external environment when viewed through the display screen making this a very efficient and versatile unit. In one embodiment, the media content being viewed in the HMD is a rich and immersive 3D environment. In some embodiments, instead of or in addition to the media content, the display screen may provide a view into a web portal of a web site while simultaneously providing a clear and undistorted view of the external environment. The display screen works with a shutter screen (or simply a shutter) that is switchable between a transparent mode and an opaque mode. The shutter may be in opaque mode when rendering the media content and may switch to a transparent mode based on an event trigger. The event trigger may be caused by a change in an external environment within the vicinity of the HMD, by a user's explicit action, by other user's actions, by a signal generated by the system, etc. With the brief understanding of the invention, specific embodiments will be discussed in detail with reference to the drawings.

Figure 1:
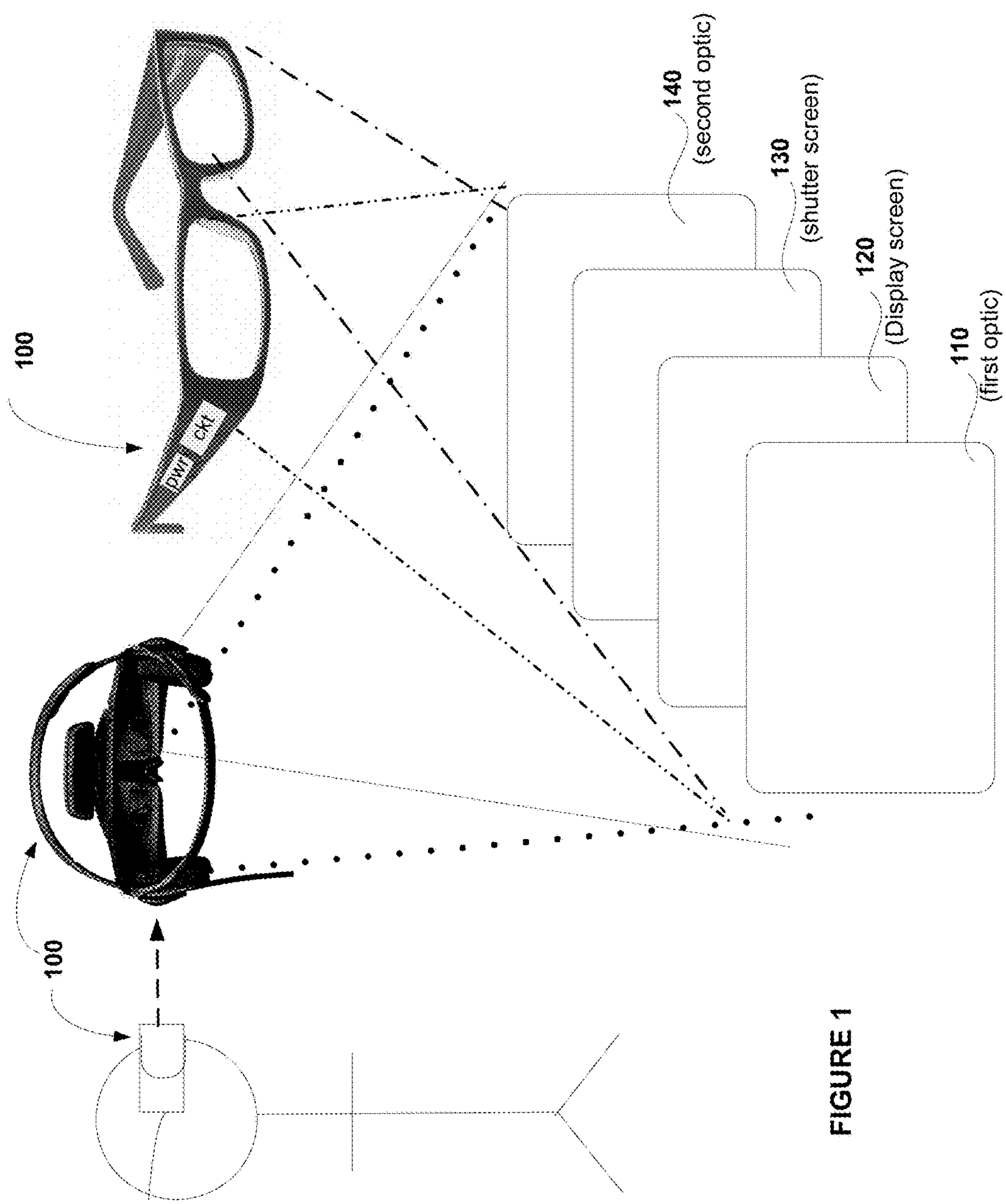
FIG. 1 illustrates different optic layers of a display screen/portion of a head-mounted display (HMD) or a pair of glasses that provide for a fully transparent display, in accordance with an embodiment of the invention.
Figure 1:
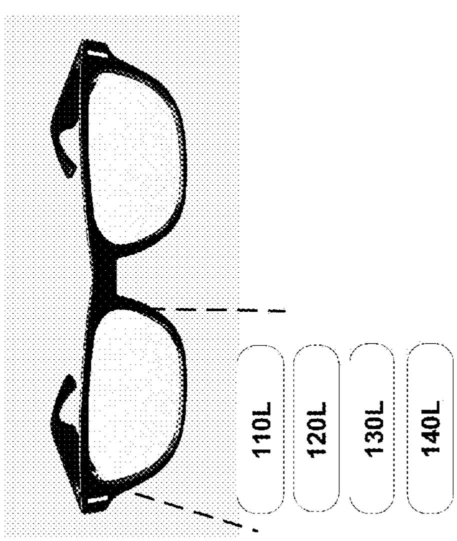

FIG. 1 illustrates a head-mounted display (HMD) and a pair of glasses with display area equipped with an enhanced optical system. The enhanced optical system is made up of a plurality of optical components. Some exemplary optical components include first optics 110, a display screen 120, a shutter screen 130 and second optics 140. In one implementation, the first optics 110 and the second optics 140 may be an aspheric lens or other optical lens structures. The display screen 120 is provided for rendering images of media content. In one example, the display screen 120 is transparent. In some embodiments, the display screen 120 of the HMD is a liquid crystal display (LCD), a tunable liquid crystal display, an organic light emitting diode (OLED), or is made from other optic materials and/or structures. In other embodiments, in addition to aforementioned list of optic materials, other optical display materials, such as Fresnel lens or Fresnel zone plates, may be used. The Fresnel lens or Fresnel zone plates are thinner, lighter, smaller than the regular optic lens. The Fresnel lens use refractive technology and Fresnel zone plates use diffraction technology at very minute level while the LCD/OLED uses refraction and/or reflection technology. The Fresnel lens works by dividing the refractive surfaces into subsections to allow a thinner light form to pass through while continuing to be refractive. The Fresnel zone plates, use diffraction and a very small feature length in order to provide the desired optical properties for the lens. The type of material/technology used for the display screen is exemplary and should not be considered exhaustive. Other materials/technology may be used so long as the lens is capable of capturing the light emitted from the object of a desired size/wavelength.

The display screen has a front side and a back side. The first optics (otherwise termed as "near-eye" optics) 110 is provided in front of the display screen 120 adjacent to the front side. The first optics is closest to the eyes of a user wearing the HMD. The first optics is configured to provide a focus for viewing the media content when rendered on the display screen. For example, the first optics may be configured to focus the image of media content on the display such that it appears to be at a far focal distance (for example, at infinity or, in some instances, at least 3 m+ distance) when viewed by the human eye. Additionally, the first optics is configured to provide a wide field of view of at least 90+ degrees. In one embodiment, in addition to the focus provided to the image, the first optics may be configured to compensate for optical characteristic deficiencies of a user of the HMD to enable the user to view the image.

The shutter screen 130 is disposed adjacent to the back side of the display screen 120. The shutter screen 130 is configured to be switched between an opaque mode and a transparent mode. When the opaque mode is activated, the shutter screen is considered to be in "closed" or "immersive" viewing mode. In this mode, the shutter screen is configured to block or exclude as much of the outside light as possible so only the media content display can be seen. When the transparent mode is activated, the shutter screen 130 is configured to be as transparent as possible allowing the real-world light (i.e., light from the external environment) to pass through the optical system. In some embodiments, the shutter screen is configured so as to allow a selective portion of the shutter screen to be switched to a transparent mode. In some embodiments, the selective portion may encompass an area that may be as small as a pixel or as big as the entire shutter screen.

The second optics 140 is placed behind the shutter screen. The second optics is configured to correct or reverse distortions caused by the near-eye optics allowing for clear, undistorted and in-focus view of an external environment through the transparent display.

The shutter screen 130 could be a mechanical screen or an electronic screen. In one embodiment, the electronic screen could be a polarized LCD system. In this embodiment, the polarity of the liquid crystal may be adjusted by applying a voltage so as to switch the shutter screen from a fully transparent mode to an opaque mode and vice versa. The switching of the shutter screen may be performed based on an event trigger. The event trigger may be caused by a gaming or other application based on conditions of the game and/or of the user wearing the HMD, by a computing device that is executing the application, based on explicit actions of a user wearing the HMD, based on explicit actions of other users that are in the vicinity of the user wearing the HMD, based on changes in external environment condition detected near the user wearing the HMD, changes in condition within the HMD caused by the rendering of the media content, or any combinations thereof.

A circuit logic defined within the HMD is used to detect change in condition within the HMD or in an external environment near the HMD and cause an event trigger. Alternately, the circuit logic may receive the signal from the application, system or a user, analyze the signal and cause an event trigger. The event trigger may result in the generation of a signal. The generated signal is interpreted and appropriate mode is activated for the shutter screen. In one embodiment that uses LCD technology, the signal may cause a voltage to be generated for changing polarity at the liquid crystals. The change in polarity will cause specific mode (either transparent or opaque) to be activated. Based on the mode activated, either the media content is rendered on the display screen or a view of the external environment from the immediate vicinity of a user wearing the HMD, is provided.

In addition to the circuit logic for controlling the mode of the shutter screen, additional circuitry, such as power circuitry to provide power to the HMD, etc., may also be provided. The power circuitry may include power source in the form of a battery, for powering the HMD. In other embodiments, the power circuitry may include an outlet connection to power. In alternate embodiments, the power circuitry may include both the battery and outlet connection to power may be provided.

FIGS. 1-1 through 1-4 illustrate various configurations of the different optical components of the enhanced optical system used in the display portion of a HMD for providing a see-through view of an external environment, in accordance with various embodiments of the invention. Although, the embodiments are described with reference to HMDs, the enhanced optical system may be integrated into a pair of glasses. FIG. 1-1 illustrates an exemplary embodiment wherein the various optical components of the enhanced optical system are disposed on the HMD so as to cover one eye of a user (i.e., either right side or left side) or to partly cover one eye of the user. In this embodiment, the remaining side is configured as normal lens/glasses. In one embodiment, the enhanced optical system as well as the normal lens/glasses portion may be designed to take into consideration any optical characteristic deficiencies of a user wearing the HMD.

Figures 1, 2:
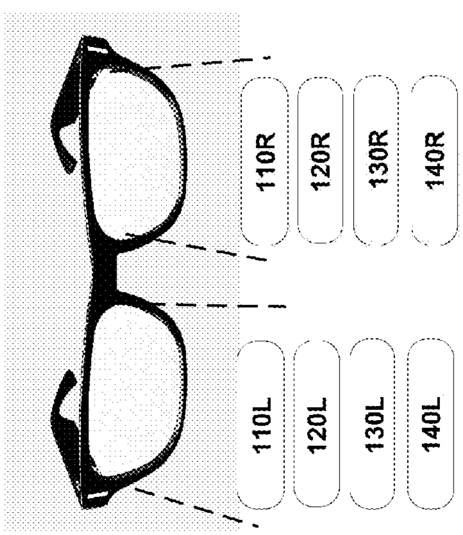

FIG. 1-2 illustrates a configuration wherein the different optical components of the enhanced optical system are disposed in front of each eye. In this embodiment, each view side of the HMD is provided with its own independent set of the optical components. Thus, the left view side of the HMD is provided with first optics 110L, display screen 120L, shutter screen 130L and second optics 140L and the right view side of the HMD is provided with first optics 110R, display screen 120R, shutter screen 130R and second optics 140R.

Figures 1, 2, 3:
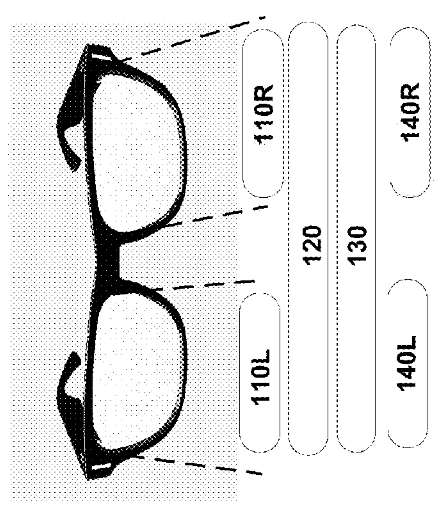
Figures 1, 2, 3, 4:
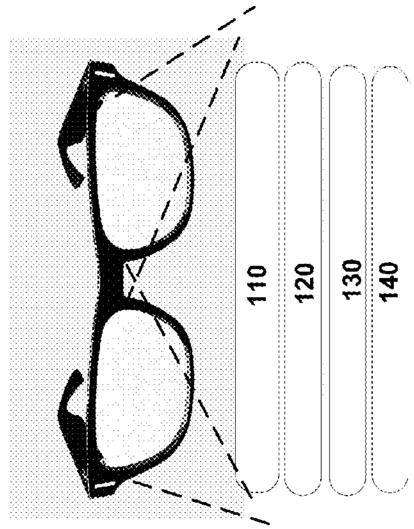

FIG. 1-3 illustrates an alternate configuration wherein some of the optical components of the enhanced optical system are common for both the viewing sides of the HMD and the other optical components that are independently disposed for each side. Accordingly, in this embodiment, the first optics (110L and 110R) and the second optics (140L and 140R) are provided individually for each viewing side of the HMD while the display screen 120 and the shutter screen 130 are shared in common between the two sides. In this embodiment, the shared optical components 120 and 130 may include one or more filtering components to filter the images/view that are presented for each eye so that the images/view may be presented in a coherent way. Similarly, the transparent and opaque mode defined for specific portions are also appropriately activated in front of each eye.

FIG. 1-4 illustrates another alternate configuration wherein each of the optical components of the enhanced optical system is shared between the two viewing sides of the HMD. In this embodiment, the first optics 110, display screen 120 (e.g., a single display), shutter screen 130 and the second optics 140 are commonly disposed in front of both the eyes. In this embodiment, each of the optical components include a filtering component to process and filter the images/view for presenting in front of each eye as well as presenting appropriate portions of the display screen in the transparent/opaque mode.

The filtering component, in one embodiment, may be designed to analyze the various objects within the images/view, identify the objects that are covered by the view range of each eye, and present the objects within the images/view to each eye at a view angle that is appropriate for that eye. For example, portions of objects in the left-most portion of the images/view that are in the range of the left eye and not the right eye are presented to the left eye and the portions of objects in the right-most portion of the images/view that are in the range of the right eye and not the left eye are presented to the right eye. Portions of objects that are common may be presented at angles that are appropriate to the view angle of each eye so that the overall images/view is presented as a single, coherent image. The filtering component may be a logical component, and/or circuitry, and/or software, and/or an optical component.

In one embodiment, even when a single display screen 120 is used, the system is still configured to render image data for each eye, just as when separate display screens 120L and 120R are used.

In one embodiment, each of the optical components are coated with an anti-reflective (AR) coating to eliminate back reflection and to increase contrast ratio so that the view of the real-world or the images of the media content are presented (i.e., exposed in true see-through, as opposed to providing an image view of an external camera) with sufficient clarity. When the different optical components are sandwiched together, the refractive index between each sandwich layer has to be considered in order to make the display portion of the HMD unit functionally efficient otherwise the reflections may amplify. Consequently, the amount of AR coating used on each layer is designed to compensate for such reflections and adjust for the respective refractive index.

Figure 1A:
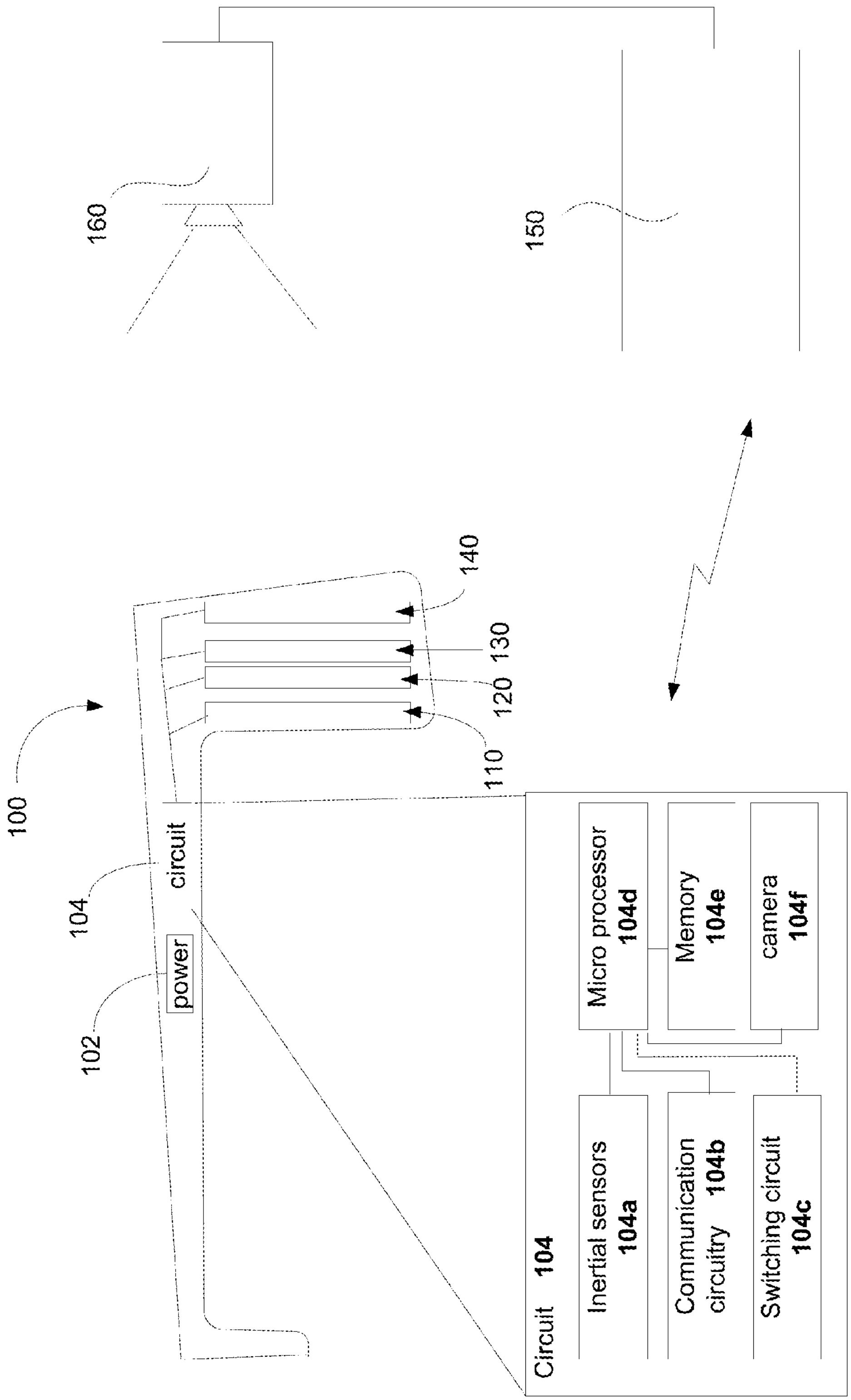
FIG. 1A illustrates various components and circuitry of a display screen of an HMD/pair of glasses, in accordance with an embodiment of the invention.

FIG. 1A illustrates exemplary modules within the circuit logic of the HMD that interact with different internal and external components/modules to provide see-through view of external environment in a display portion of the HMD. As mentioned, the HMD includes an enhanced optical system with a plurality of optical layers sandwiched together. The display screen 120 and the shutter screen 130 of the display portion of the HMD are connected to a circuit 104 provided within the HMD 100. In addition to the circuit 104, the HMD includes power circuit 102 that provides the power to the HMD. Alternately, the power circuit 102 may include outlet connection to a power source that supplies the power to the HMD for the HMD to operate.

The circuit 104 includes a plurality of modules that keep track of movements/gestures provided by a user wearing the HMD, provided by other users near the user wearing the HMD, or change in the external environment in the vicinity of the user wearing the HMD and either process (partially or fully) the data obtained from the tracking and/or transmit the data to a computing device for further processing. Some of the modules that are available in the circuit include inertial sensors 104*a*, communication circuitry 104*b*, switching circuit 104*c*, micro processor 104*d*, memory 104*e*, and camera 104*f*, to name a few examples. The list of modules within the circuit is exemplary and should not be considered exhaustive or limiting. Additional or fewer modules may be included for processing the data and media content that are to be rendered on the display portion of the HMD. The inertial sensors 104*a* may include one or more of magnetometers/compass, accelerometers, gyroscopes that are used to identify and process one or more users' input detected by the circuit. In one embodiment, the user's input may be in the form of change in orientation of the HMD, location of one or more users, etc. The processed data is forwarded to the microprocessor 104*d* and/or stored in memory 104*e* for subsequent processing/rendering.

The communication circuitry 104*b* may include network interface cards (NICs), application programming interfaces (APIs), etc., to establish communication between the HMD 100 and a computing device 150, such as a game console or any other computing device. Alternately, the communication circuitry may communicate with an application executing on a cloud server (not shown) over a network (not shown). The communication circuitry may communicate using a wired connection or a wireless connection. The communication circuitry receives media content from the computing device 150 or from a cloud server (not shown) data captured by one or more externally mounted cameras 160, and forwards the media content and captured data to the microprocessor 104*d* for further processing.

One or more cameras 104*f* may be disposed within the HMD. These cameras 104*f* are forward facing cameras that may be used to capture images of external environment in the immediate vicinity of the user wearing the HMD and transmit the captured images to the micro processor 104*d* for further processing. The captured images provide a user's perspective of the external environment. The images captured by the cameras 104*f* can be used to detect changes in the environment, present alerts to the user, enable mode transition, etc. The cameras 104*f* could be stereo cameras, infrared (IR) cameras, depth cameras, or any combinations thereof.

The micro processor 104*d* receives media content data from the communication circuitry 104*b*, processes the media content data including formatting of the media content and presents the formatted media content on the display screen 120, when the shutter screen 130 is in an opaque mode. The processing logic of the micro processor 104*d* and the processed data may be stored in the memory 104*e*. The micro processor may also process the data captured by the cameras (for e.g., cameras 104*f* and in some embodiments, camera 160), data from the inertial sensors 104*a*, data from audio sensors (not shown), etc., and forward the processed data to the computing device/cloud server through the communication circuitry 104*b* so that the computing device 150/cloud server may be able to provide appropriate media content based on the data provided by the HMD. The data provided by the inertial sensors and the camera may identify input data that affect the outcome of the application (e.g., game application) or the mode of the display screen.

A switching circuit 104*c* within the circuit 104 is used for switching the shutter screen between a transparent mode and an opaque mode. The mode switching on the shutter screen may be initiated by an event trigger. The event trigger may be caused by a change in condition in the external environment near vicinity of the user wearing the HMD (detected by camera 104*f* and/or camera 160) or caused by change in condition within the HMD, or by an application providing the media content, or by the computing device 150 or cloud server that is communicatively connected to the HMD or by explicit action of a user or any combinations thereof. The switching circuit 104*c* analyzes the event trigger and generates a signal for the switch. The generated signal includes details about the mode that has to be activated and specific portions of the shutter screen for activating the mode. The signal is transmitted to the micro processor 104*d*. The micro processor 104*d* receives the signal, interprets the signal and activates appropriate mode in the specified portions of the shutter screen. In one embodiment, the micro processor may adjust the voltage supplied to specific portions of the shutter screen causing change in the mode in the specific portion. The adjustment of voltage is one exemplary way of changing the mode and may be employed for shutter screen that use LCD technology. For shutter screens that do not use the LCD technology, alternate ways of adjusting the mode may be employed. The enhanced optical system of the HMD allows mode change to be performed on a portion of the shutter screen that is as small as a pixel or as large as the entire shutter screen.

In some embodiments, in addition to sending the mode change signal to the shutter screen, the micro processor may also send media content to the display screen for rendering alongside a portion wherein the transparent mode is activated. In other embodiments, instead of or in addition to the media content, the micro processor 104*d* may also send content from a web portal of a website for rendering on the display screen.

FIGS. 2A-2D illustrate exemplary system configuration for selectively adjusting the mode of the display screen of the HMD for providing see-through view of the external environment, in accordance with different embodiments of the invention. In the embodiment illustrated in FIG. 2A, the system includes the HMD 100 equipped with an enhanced optical system. Although the various embodiments described herein are directed toward HMD, the description can be extended to a pair of glasses 100 equipped with enhanced optical system. The HMD 100 includes a power circuit 102 and other circuitry 104 that allows selectively switching display mode in a portion of a shutter screen in order to provide see through view of the external environment. The other circuitry 104 includes controller/processor 104*d* that is communicatively connected to a computing device 150. Other components within the other circuitry 104 are similar to the components described with reference to FIG. 1A. The computing device may be any general or special purpose computer, including but not limited to, game console, a personal computer, a laptop computer, tablet computer, mobile device, cellular phone, thin client, set-top box, media streaming device, kiosks, digital pads, or any other computing device that is capable of providing media content for rendering on the display screen of the HMD 100. The HMD is connected to the computing device 150 wirelessly or through wired connections to receive media content and to transmit user actions and other data detected by the HMD for processing at the computing device 150. In this embodiment, the computing device may execute the game or application locally on the processing hardware of the computing device and provide media content for rendering on the HMD. The application or game executed by the computing device can be obtained in physical media form, such as digital discs, tapes, thumb drives, solid state chips, cards, etc., or can be downloaded from the Internet, via network 200. The user actions may provide input that affects the outcome of the application executing on the computing device, may be used to adjust mode of the shutter device and/or the content that is rendered on the display screen of the HMD.

Figure 2A:
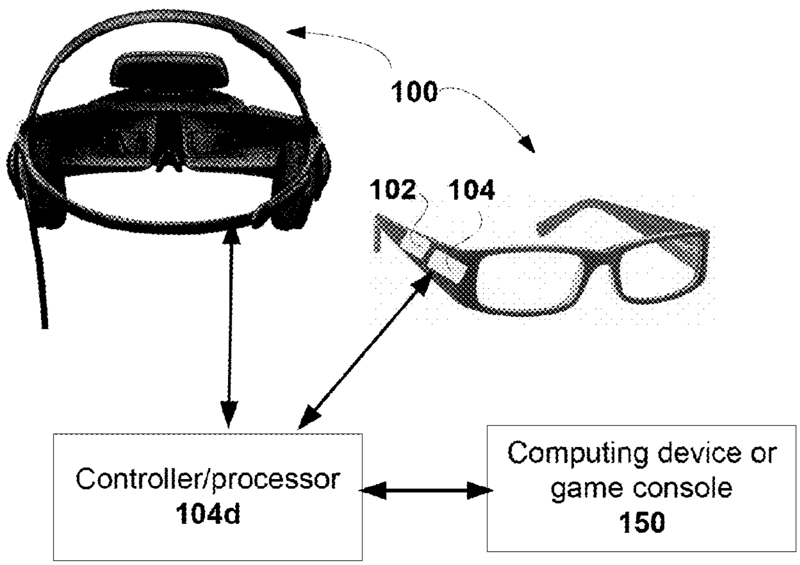
FIGS. 2A-2D illustrate examples of systems in which the display screen of the HMD is engaged for rendering media content and for viewing external environment, in accordance with different embodiments of the invention.
Figure 2B:
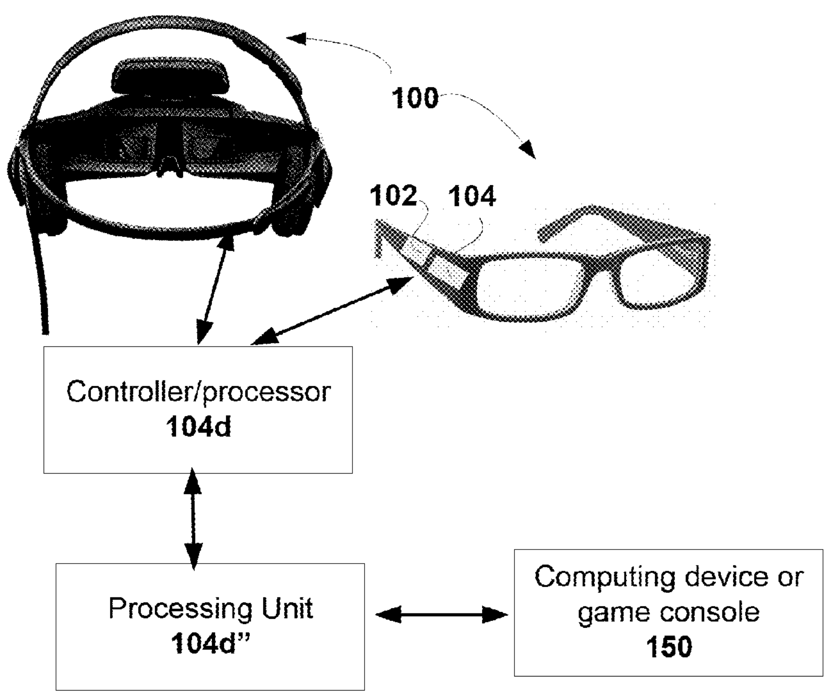

FIG. 2B illustrates an alternate configuration of a system. In this embodiment, the HMD or the glasses with enhanced optical system is communicatively connected to a processing unit 104*d*", which is, in turn, connected to a computing device 150. The HMD includes components, such as a display, enhanced optical system, communication circuitry, inertial sensors, an optional camera, memory and a microprocessor 104*d*, that are similar to the ones defined with reference to FIG. 1A. The microprocessor 104*d*, in this embodiment, may be a low complexity microprocessor that is designed to consume less power and perform minimal processing of data. The low complexity microprocessor allows the HMD to be designed to be light weight. The processed data and other input data are transmitted by the processor 104 of the HMD to the processing unit 104*d*" where all or some of the heavy duty processing is performed. The processing unit 104*d*" transmits the processed and unprocessed data to the computing device 150 for further processing. The processing unit 104*d*" may be connected to the controller 104*d* of the HMD and to the computing device 150 through wired or wireless connections. In this embodiment, a camera 160 may be connected to the computing device 150 where the images from the camera 160 are processed. In one embodiment, the processing unit 104*d*" may connect to a computing device on a cloud over the Internet.

Figure 2C:
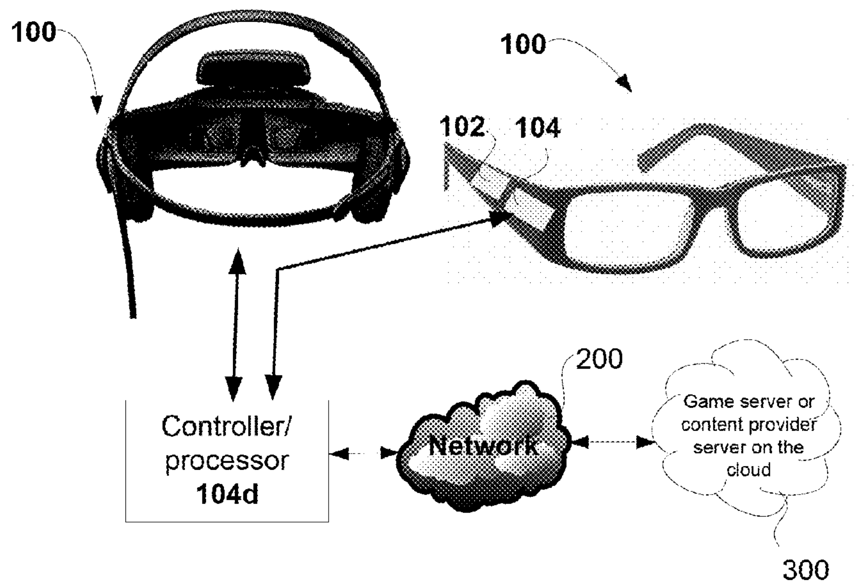

FIG. 2C illustrates an alternate configuration of a system. In this embodiment, the HMD may be communicatively connected to a cloud server, such as a content provider server or a game server 300, over a network 200, such as the Internet. The communication connection between the HMD and the Internet, in this embodiment, allows for cloud gaming or cloud sharing of media content without the need for a separate local computer. In one embodiment, the HMD 100 acts as a networked device with connection to the cloud game server 300, wherein the communication between the controller/micro processor 104*d* of the HMD 100 and the Internet 200 may be through wired or a wireless connection. In some other embodiment, the controller/micro processor 104*d* may communicate with the cloud game server 300 over the Internet 200, through a local network device, such as a router (not shown). The router does not perform any processing of data content but just facilitates passage of the data content between the HMD and the cloud game server. The communication between the controller 104*d* and the router may be a wireless connection or a wired connection. It should be noted that the controller 104*d* is different from a hand-held controller (not shown) that is used for interacting with media content and for providing user input to the media content.

Figure 2D:
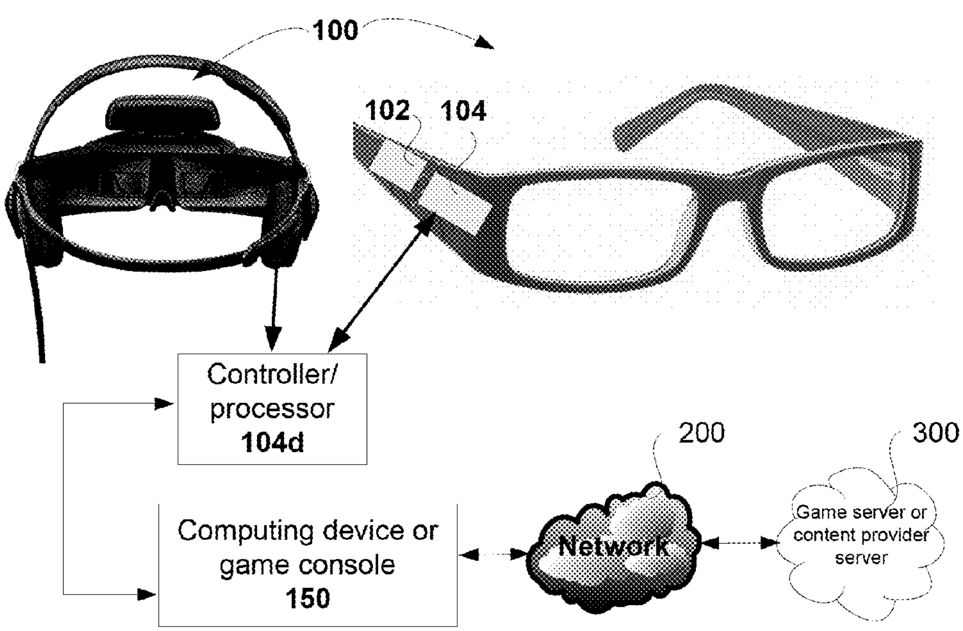

FIG. 2D illustrates another alternate configuration of a system. In this embodiment, the HMD may be communicatively connected to a cloud server 300 through a computing device 150 and the network 200. The computing device 150, in this embodiment, will act as a client communicating with the cloud server over the network and the cloud server will maintain and execute the application, such as the video game, providing media content related to the application to the computing device 150. In this embodiment, the controller of the HMD communicates with the computing device 150 over a wired or wireless connection transmitting the input data and the computing device will communicate with the cloud server over a wired or wireless connection and such connection may be a direct connection or routed through a router. The computing device receives user input from the HMD 100, may process the user input before transmitting the user input to the cloud server. The cloud server receives the user input and processes the user input to affect a state of the application, such as game state of a video game. In response to receiving the user input, the cloud server 300 may generate updates to the media content reflecting the state of the application and transmit such updates to the computing device 150. The computing device 150 may further process the updates for the media content and transmit the data to the HMD for rendering on the display screen. Additionally, part of the processed media content may be transmitted to other devices, such as a game controller, that was used to provide input to the application. For example, video and audio streams of the updates may be provided to the HMD and the haptic feedback may be provided to the game controller. It should be noted herein that although the embodiments are described with reference to executing video game application for game play, the embodiments may also be extended to other applications that may be executed by the cloud content provider.

Figure 3A:
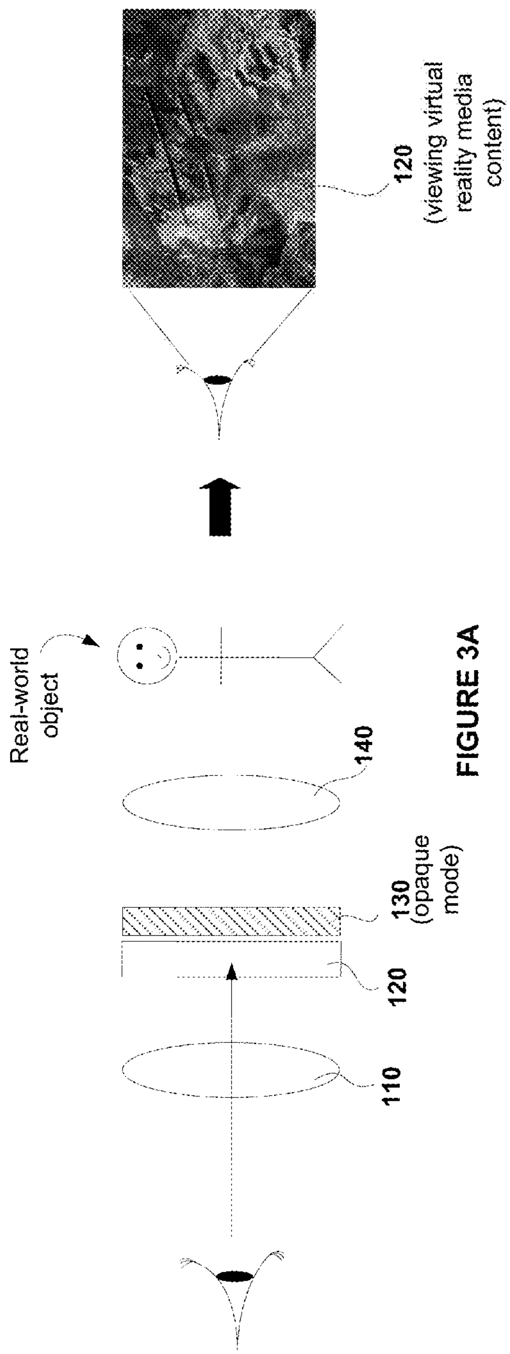
FIGS. 3A-3B illustrate examples of views, during usage of the HMD, based on the different settings of the display screen, in accordance with different embodiments of the invention.
Figure 3B:
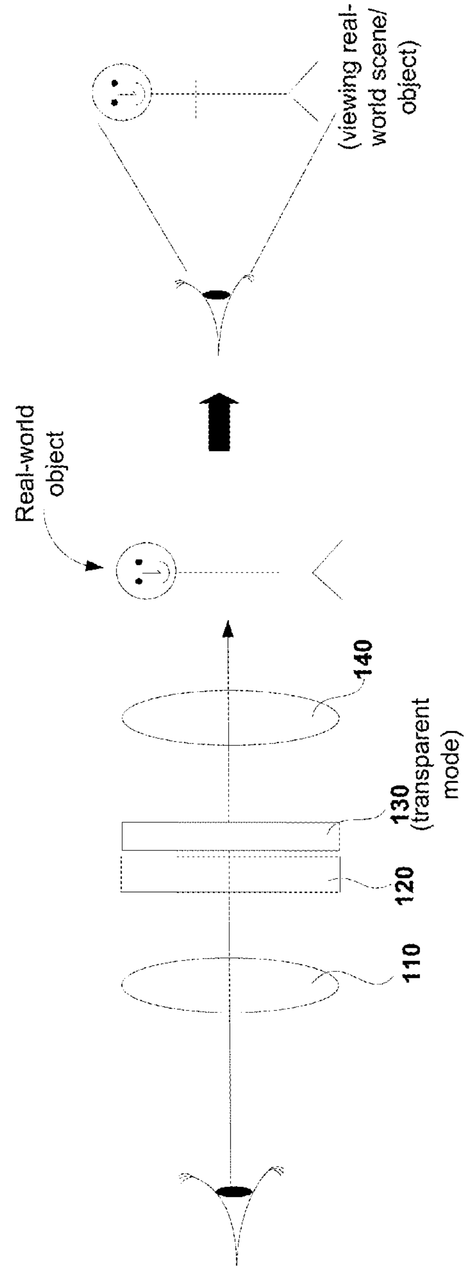

FIGS. 3A and 3B illustrate how the different modes of the shutter screen affect what is viewed by the user. FIG. 3A illustrates an embodiment where an opaque mode is activated on the shutter screen. The opaque mode causes blockage of light from the external environment from passing through the shutter screen and the display screen of the HMD. The shutter screen acts to provide a dark background. The media content provided to the HMD is rendered on the display screen. Since the display screen is transparent, the media content transmitted to the display screen is projected onto the dark shutter screen. The first optics 110 in the display screen adjusts the media content to allow user a clear viewing of the media content. The first optics has a first focus setting that allows the media content to render at infinity. The content that is viewed by a user is illustrated to the right side of FIG. 3A. The user is presented with media content on the display screen when the opaque mode is activated for the entire shutter screen. In alternate embodiments, only a portion of the shutter screen may be rendered opaque and appropriate portion of the media content may be rendered on the display screen while the remaining screen may be rendered dark.

FIG. 3B illustrates an embodiment where a transparent mode is activated on the shutter screen 130. In this embodiment, the transparent mode is activated on the entire shutter screen 130. When the transparent mode is activated, the shutter screen 130 provides a see-through capability by allowing light from the external environment to pass through the shutter screen component of the optical system. Since the display screen 120 is transparent, the user is provided with a view of external environment. In order to provide a clear, in-focus view of the external environment, the second optic 140 set at a second focal setting provides the necessary correction so that the distortion caused by the first focal setting of the first optic is cancelled out by the second focal setting of the second optic. The right side of FIG. 3B illustrates the external environment view that is presented to the user. In some embodiments, in addition to providing in-focus image, the first focal setting provided in the first optic, may also include optics to compensate for any optical characteristic deficiencies in a user's vision. As a result, the second focal setting is configured to compensate for the first focal setting while taking into consideration the optical discrepancy of the user so that the view of the external environment is clear and in-focus for the user.

In some embodiments, the first focal setting of the first optics and the second focal setting of the second optics may be dynamically adjusted based on each user's optical characteristic requirements. For example, when user A who has some optical characteristic discrepancy elects to use the HMD, the first and second focal settings within the enhanced optical system of the HMD address the optical characteristic discrepancy of user A. When user B who has normal vision elects to use the same HMD, the first focal setting and the second focal setting for user B may be dynamically adjusted for normal vision so as to provide a clear and in-focus view of the media content and of the external environment for user B depending on the mode activated on the shutter screen. In one embodiment, the controller in the HMD may be configured to provide appropriate adjustments to the focal setting of the first optics and the second optics based on the user using the HMD.

FIGS. 4A-4F illustrates exemplary display screens that correspond to the portions of the shutter screen that are rendered transparent, in different embodiments. The transparent mode allows the portion of the display screen to provide see-through view of the external environment. In these examples, the portions that are made to be transparent are regions of one display screen, when viewed by both eyes of a user. For example, although each eye may be viewing through different optics and two different screens (in some embodiments), the collective view that is perceived by the user (i.e., one unified screen or display) is the display that is caused to be transparent in one or more locations, regions or areas.

Figure 4A:
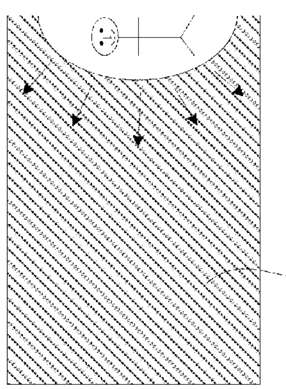
FIGS. 4A-4F illustrate examples of display screen allowing view of external environment when select portion(s) of a shutter screen are rendered in transparent mode while remaining portions of the shutter screen are blocked, in accordance with different embodiments of the invention.
Figure 4B:
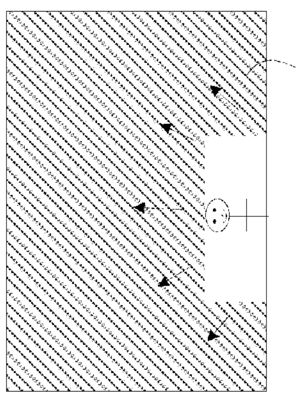
Figure 4C:
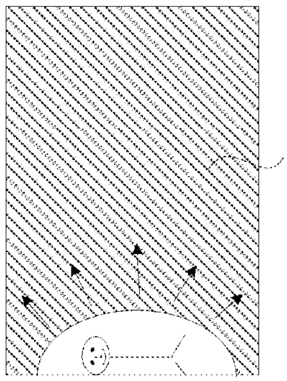
Figure 4D:
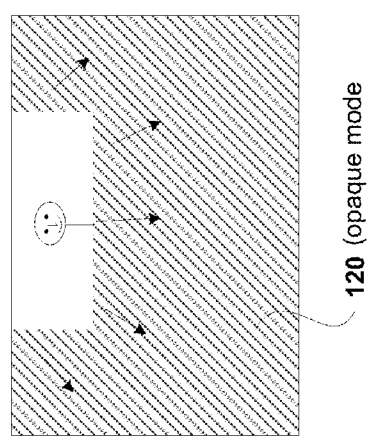
Figure 4E:
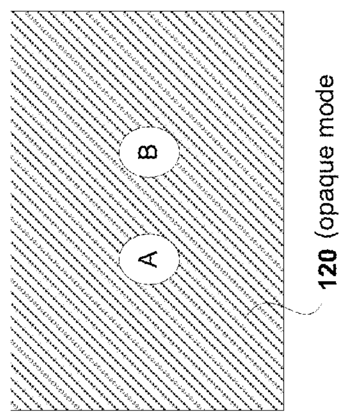
Figure 4F:
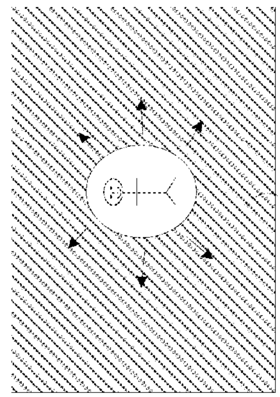

In these embodiments, the size and shape of the portion of the shutter screen that is rendered in transparent mode may be dynamically changed to cover a bigger portion of the shutter screen, as illustrated by the outwardly facing arrows. Based on the size, shape and location where the transparent mode is activated, appropriate view of the external environment may be presented to the user of the HMD. In these embodiments, the remaining portions of the shutter screen are considered to be in opaque mode. FIG. 4A illustrates the transparent mode of the shutter screen being activated in a portion on the right side of the screen while the remaining portions are rendered opaque. In this embodiment, a portion of the external environment is viewable through the transparent portion, as illustrated by the rendition of a person from the real-world in the transparent portion while the remaining portions of the display screen are rendered dark. FIG. 4B illustrates a portion of the display screen corresponding to the bottom portion of the shutter screen that is transitioned to the transparent mode, presenting (or exposing) real-world view while the remaining portions of the display screen are maintained dark. FIG. 4C illustrates the left side portion of the display screen and FIG. 4D illustrates the top portion of the display screen corresponding to the portion of the shutter screen that is transitioned to transparent mode, allowing a view to the real-world scene. The activation of the transparent mode is not restricted to the four edges but can be extended to other areas as shown in FIGS. 4E and 4F. In one embodiment illustrated in FIG. 4E, the transparent mode is activated in portions of shutter screen that correspond to area covering each eye. As a result, portions A and B of the display screen provide a see-through into the real-world scene while the remaining portions of the display screen are maintained dark. In another embodiment illustrated in FIG. 4F, only the center portion of the shutter screen is defined to be transparent. Consequently, in this embodiment, the real-world scene is viewed through the corresponding center portion of the display screen.

Figure 4G:
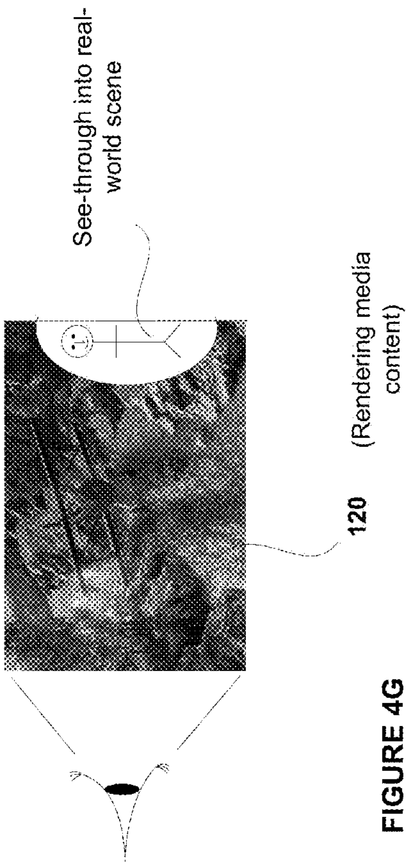
FIG. 4G illustrates an exemplary view of a display screen allowing partial view of external environment while media content is being rendered, in one embodiment of the invention.

FIGS. 4G, 4H-1 and 4H-2 illustrate slight variations to the embodiments illustrated in FIGS. 4A-4F. FIG. 4G illustrates an embodiment where the right side portion of the shutter screen is transparent and the corresponding portion of the display screen is used to present content from the real-world view. The remaining portions of the shutter screen are maintained in opaque mode and the corresponding portions of the display screen are rendering media content from an application executing on a computing device (either a server or a local computer) connected to the HMD. The difference between the embodiments illustrated in FIGS. 4A-4F and the embodiment of FIG. 4G is that instead of the remaining portions of the display screen being dark, as shown in FIGS. 4A-4F, the remaining portions in FIG. 4G are rendering the media content while the select portion on the right side is allowing a view of the real-world scene.

Figures 1, 4H:
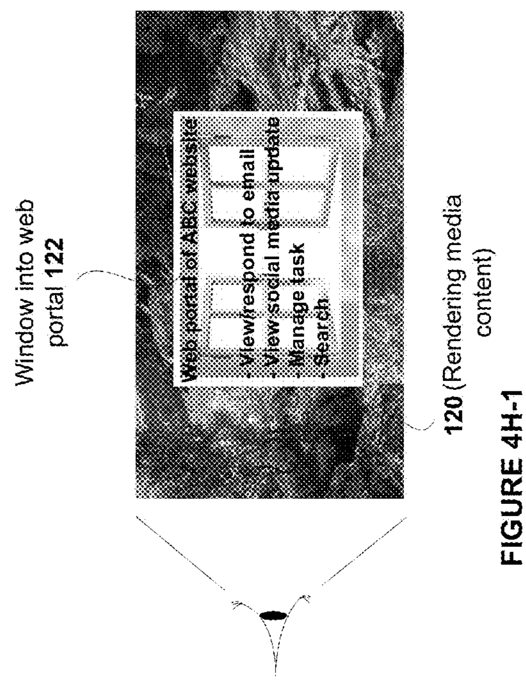
Figures 2, 4H:
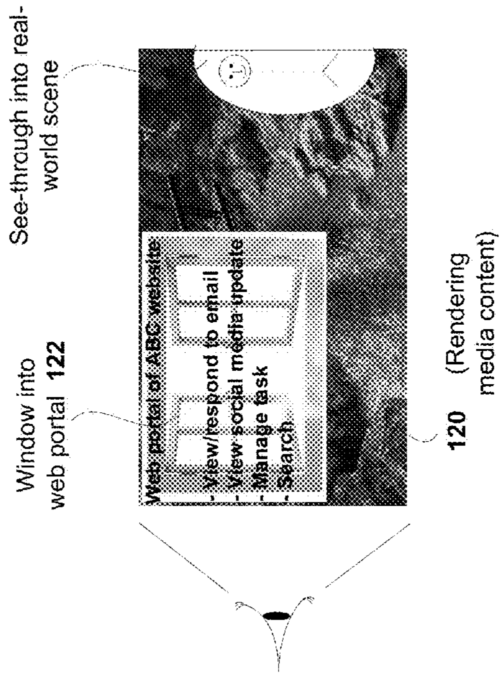

FIG. 4H-1 illustrates an alternate embodiment, wherein instead of allowing a view of the external environment in the portion of the display screen by transitioning the corresponding portion of the shutter screen to transparent mode, the portion of the display screen may be used to render a view of a web portal 122 from a web site while the remaining portions of the display screen continue to render the media content. In this embodiment, the entire shutter screen is maintained in opaque mode.

In another embodiment illustrated in FIG. 4H-2, the portion of the display screen corresponding to the portion of the shutter screen that has transitioned to the transparent mode, allows viewing through to the external environment in the vicinity of the user wearing the HMD. In this embodiment, a portion of the display screen corresponding to one of the remaining portions of the shutter screen that is in opaque mode renders a view of a web portal 122 from a web site. The remaining portions of the display screen 120 continue to render the media content. As can be seen, different portions of the shutter screen may be transitioned to transparent mode so that corresponding portion(s) of the display screen may allow a view of the external environment (i.e., see through) while different portions of the display screen corresponding to portions of the shutter screen that are in opaque mode may render different content, including different media content, web portal content, etc. This feature provides multi-tasking capability by selectively switching different portions of the shutter screen to transparent mode and/or providing a user with the ability to view different content. In one embodiment, the different content that is rendered in different portions may be selected by a user through user action. In other embodiments, the different content that is rendered may be selected by the application or the computing device based on an event trigger.

Figure 5A:
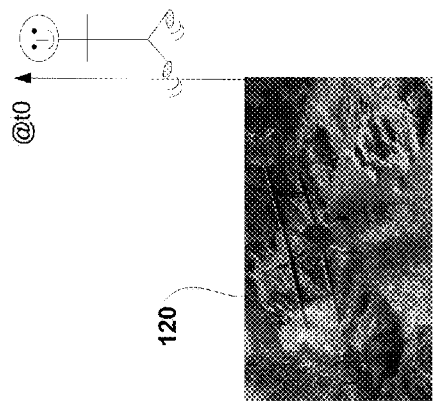
FIGS. 5A-5E illustrate exemplary views of a display screen when different portions of the shutter screen are rendered transparent to follow a moving object from real-world environment, in accordance with embodiments of the invention.
Figure 5B:
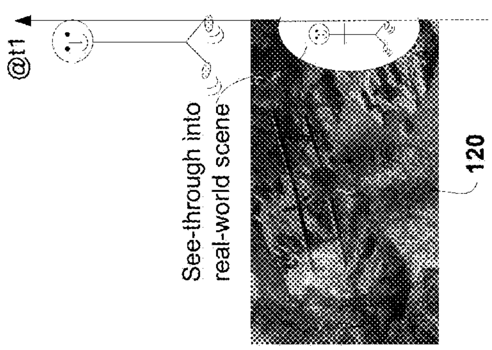
Figure 5C:
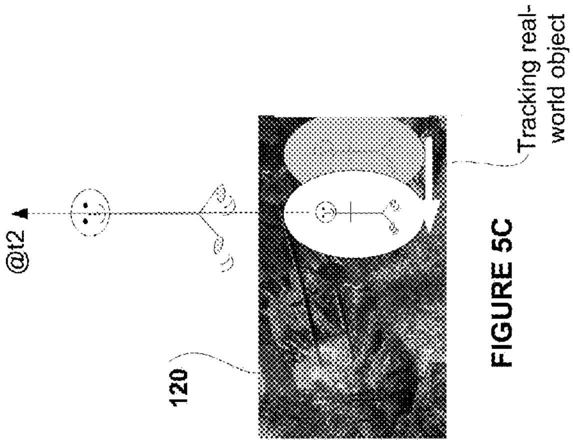
Figure 5D:
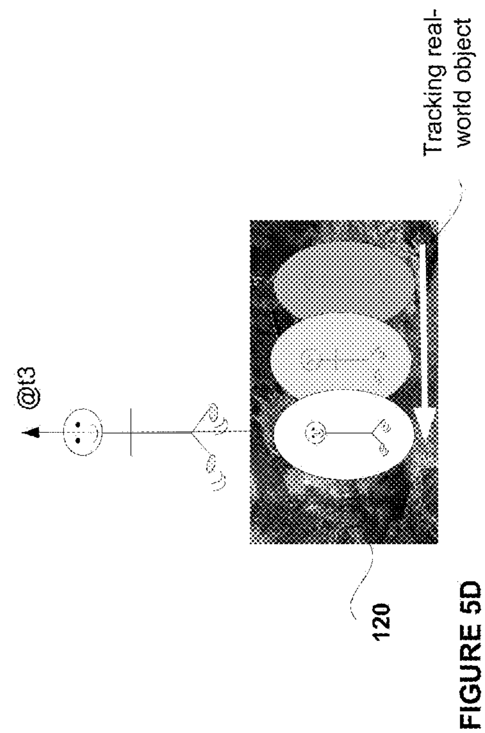
Figure 5E:
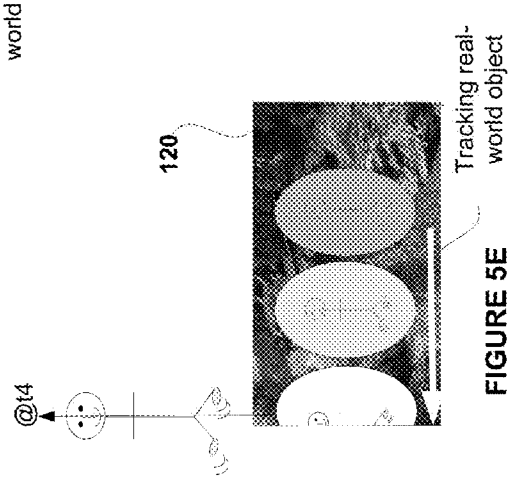

FIGS. 5A-5E illustrate an embodiment wherein different portions of the shutter screen are selectively switched based on an event trigger detected in the external environment in the vicinity of a user wearing the HMD. For example, the event trigger may be caused by change in the external environment caused by a moving object that comes in the sight of the display portion of the HMD. FIG. 5A illustrates the status of the content being rendered in the display screen of the HMD at time t0 when no event triggers have been detected. At time t1, an event trigger caused by a person walking into line-of-sight of the display screen, is detected, as illustrated in FIG. 5B. In response to the event trigger, a right side portion of the shutter screen is transitioned to transparent mode allowing the user wearing the HMD to view the cause of the event trigger. As the person continues to walk in the sight of the display screen, the controller of the HMD tracks the person's movement and activates transparent mode in different portions of the shutter screen so as to allow the user to view and follow the person's movement across the screen, as illustrated in FIGS. 5C-5E corresponding to times t2-t4. In this embodiment, one or more inertial sensors within the HMD and one or more cameras connected to the HMD may be used to track the person's movement and such information is used by the controller to activate the transparent mode in appropriate sections/portions of the shutter screen. Based on the movement of the person (or an object), portions that were previously transitioned to transparent mode are switched back to opaque mode and newer portions of the shutter screen that are in line of the person's movement are transitioned to transparent mode. In the embodiments illustrated in FIGS. 5A-5E, the portion that is being transitioned to transparent mode is represented by a geometric shape, such as an oval, a square, a rectangle, a circle, etc., and the external environment view is presented within the defined geometric shape.

It should be noted herein that the embodiments illustrated in FIG. 5A-5E are not restricted to tracking a moving object but can be extended to tracking relative motion, as well. For instance, in the example illustrated in FIGS. 5B-5E, the person may be stationary but the user wearing the HMD may be moving or rotating his/her head. In this case, the relative motion of the HMD wearer may be tracked in relation to the stationary person and the appropriate modal changes activated at relevant portions of the shutter screen to display appropriate media content and/or provide a view of the external environment based on the tracking.

Figure 5F:
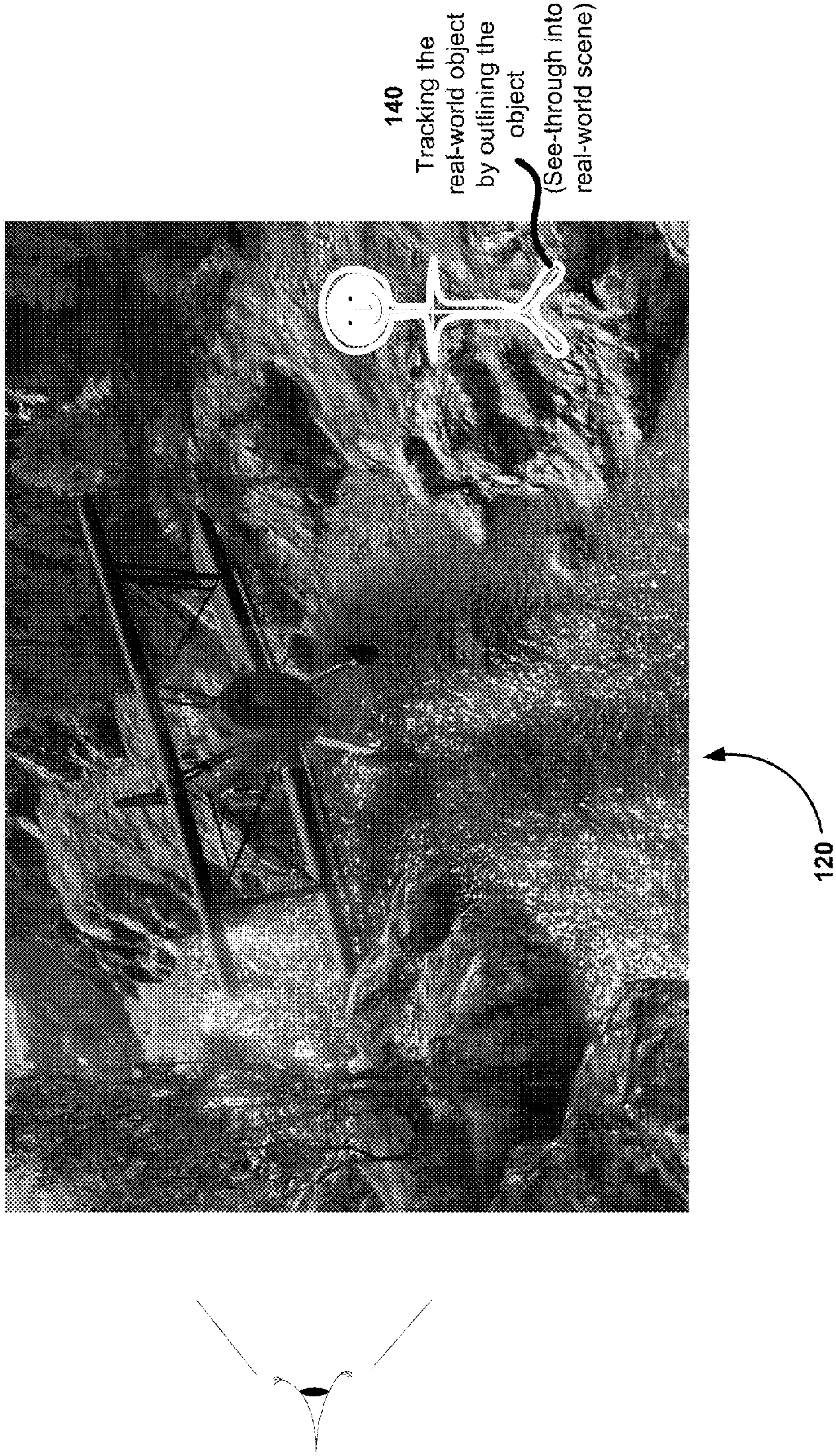
FIG. 5F illustrates an exemplary view of a display screen rendering an outline of a real-world object alongside media content, in accordance to an embodiment of the invention.

The portion of the display screen that is transitioned to transparent mode need not have to take a particular geometric shape but can cover an outline of an object. FIG. 5F illustrates one such example, in an alternate embodiment. As shown, the portion that is transitioned to transparent mode may correspond to an outline of an object whose presence or movement triggered the mode transition event. For example, in the above example where a person walks within the line of sight of the display screen of the HMD, the portion of the shutter screen that is transitioned to transparent mode corresponds to the outline of the person so that a view of the person's outline can be presented to the user.

Figure 5G:
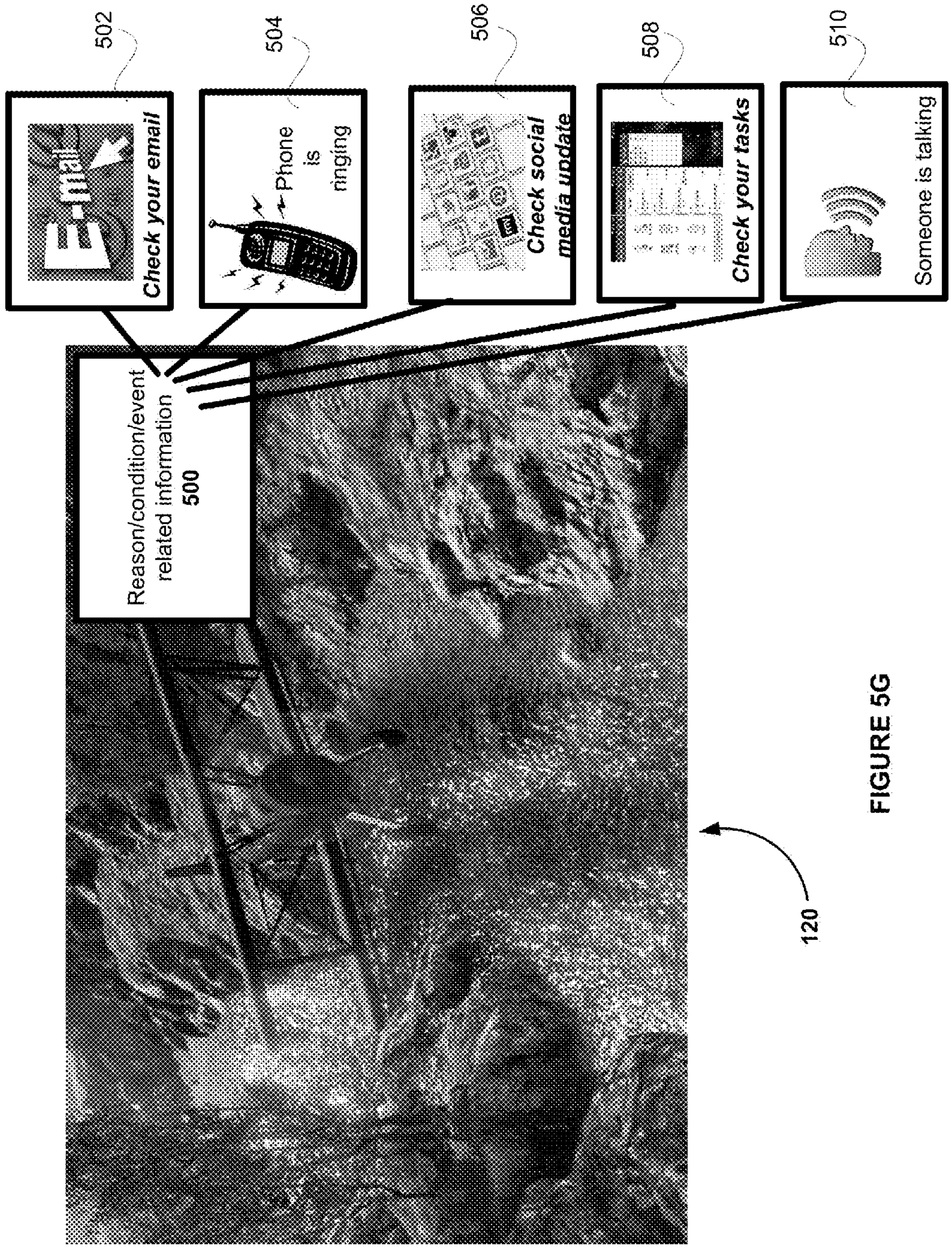
FIG. 5G illustrates an exemplary view of a window in a portion of a display screen corresponding to a portion of the shutter screen that is rendered transparent, in accordance with an embodiment of the invention.

The event trigger is not restricted to an object or person moving into view of the display screen of the HMD. The event trigger may be caused by a reason, such as a task that needs to be carried out, a calendar event that comes due, etc., a change in condition of the external environment that includes audio or visual signal, such as a telephone ringing or a user being addressed to, or a person talking in the background, a loud noise, a door bell ringing, a thunder/lightning, a flash light going off, etc. FIG. 5G illustrates some exemplary reasons/conditions/events that cause the trigger event to occur. In response to the event trigger, the controller examines the cause of the event trigger and opens a window 500 in the display screen of the HMD to present information related to the reason/condition/event detected in or near the HMD. The window 500 may present task related information, as illustrated in windows 502, 506 or 508, or event related information, as illustrated in windows 504 and 510. The list of events/reasons/conditions illustrated in FIG. 5G are exemplary and have been provided for illustrative purposes and should not be considered as exhaustive. Other reasons, conditions or events may also be used to cause the activation of a window within the display screen of the HMD. In this embodiment, the window does not transition the shutter screen to transparent mode but provides the appropriate window in the display screen. Alternately, any reason, condition, or event may be used to activate transparent mode in at least portion of the display screen of the HMD.

As mentioned earlier, the HMD 102 can be connected to a computer 106. The connection to computer 106 can be wired or wireless. The computer 106 can be any general or special purpose computer, including but not limited to, a gaming console, personal computer, laptop, tablet computer, mobile device, cellular phone, tablet, thin client, set-top box, media streaming device, etc. In some embodiments, the HMD 102 can connect directly to the internet, which may allow for cloud gaming without the need for a separate local computer. In one embodiment, the computer 106 can be configured to execute a video game (and other digital content), and output the video and audio from the video game for rendering at the HMD 102. The computer 106 is also referred to herein as a client system 106*a*, which in one example is a video game console.

The computer may, in some embodiments, be a local or remote computer, and the computer may run emulation software. In a cloud gaming embodiment, the computer is remote and may be represented by a plurality of computing services that may be virtualized in data centers, wherein game systems/logic can be virtualized and distributed to user over a network.

The user 100 may operate a game-controller (not shown) to provide input for the video game or application. In one example, a camera 160 can be used to capture image of the interactive environment in which the user is located. These captured images can be analyzed to determine the location and movements of the user, the HMD 100 worn by the user, and the game-controller. In one embodiment, each of the controller and the HMD 100 may include one or more light elements/markers which can be tracked in substantial real-time during interaction with the application, such as video game, to determine the controller and/or the HMD's location and orientation.

One or more image capturing devices, such as cameras 104*f*, 160 of FIG. 1A, may be disposed within or near the HMD to capture the image of the external environment and of the user wearing the HMD. The cameras and the HMD can include one or more microphones to capture sound from the interactive environment. Sound captured by a microphone array may be processed to identify the location of a sound source. Sound from an identified location can be selectively utilized or processed to the exclusion of other sounds not from the identified location. The cameras 104*f*, 160 can be defined to include multiple image capture devices (e.g. stereoscopic pair of cameras), an IR camera, a depth camera, and combinations thereof.

In some embodiments, the image of an external environment object seen through the display screen, when the transparent mode is activated, may be augmented with virtual elements to provide an augmented reality experience, or may be combined or blended with virtual elements within virtual scenes in other ways. The media content provided by an application executing on a cloud server may be obtained from various content sources and may include any type of content. Such content, without limitation, can include interactive game content, video content, movie content, streaming content, social media content, news content, friend content, advertisement content, informational content, etc. In one embodiment, the computing system 150 can be used to provide other content, which may be unrelated to the media content that is being rendered on the display screen of the HMD.

Figure 6:
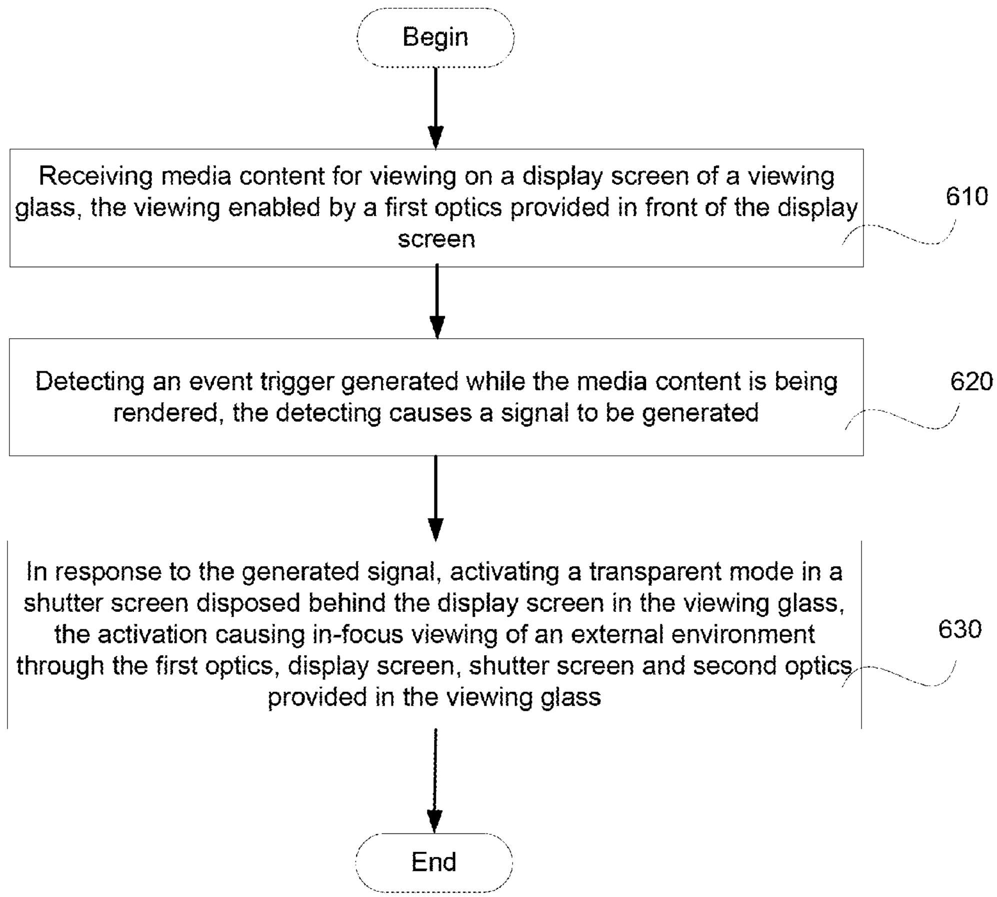
FIG. 6 illustrates various method operations associated with using a head-mounted display providing view through the display screen, in accordance with an embodiment of the invention.

With the above detailed description of the various embodiments, a method for providing a see-through mode within a display screen of a HMD will now be described with reference to FIG. 6. The method begins at operation 610, wherein media content is received for viewing on a display screen of a viewing glass. The viewing glass can be a single lens glass, such as a monocle, a two lens, such as a regular pair of looking glass, a head-mounted display, or any other viewing device that is configured to be communicatively connected to a computing device or a server to receive the media content for rendering. The media content is adjusted for viewing by first optics that is provided in the viewing glass in front of the display screen to enable a user to have an in-focus view of the media content.

An event trigger is detected at the viewing glass while the media content is being rendered, as illustrated in operation 620. The event trigger may be initiated by a computing device executing an application that provides the media content, a server, an operating system of the computing device or the HMD, the HMD, or by user action of the user wearing the HMD, by user actions of other users in the vicinity of the user wearing the HMD, or by a change detected in the external environment in the vicinity of the user wearing the HMD, or any combinations thereof. The event trigger may be in the form of visual change, haptic change, audio change, etc. The event trigger is processed by the controller of the HMD and a signal is generated.

In response to the generated signal, a transition mode is activated on a portion of the shutter screen disposed behind a display screen of the viewing glass, as illustrated in operation 630. The activation of the transparent mode allows viewing of an external environment through corresponding portions of the first optics, display screen, transparent mode of the shutter screen and second optics. The second optics is provided to correct any distortions that may be caused by the first optics so that viewing through the viewing glass will be clear and in-focus.

The various embodiments describe a display screen that is equipped with an enhanced optical system that allows a user to experience immersive virtual reality as well as be able to directly view the external environment clearly. The first set of optics in the enhanced optical system provides for in-focused display of media content and a second set of optics allows for a "natural" vision of the external environment. An adjustable shutter in the enhanced optical system can be programmed to control the switching between an open mode and a closed mode to allow the user to either completely immerse in the virtual reality or be able to view the real-world view.

As described with reference to FIG. 1A, the HMD 100 of the various embodiments described herein may include a plurality of modules or components for efficient processing of media content using the enhanced optical system and for allowing see-through capability to view external environment.

Figure 7:
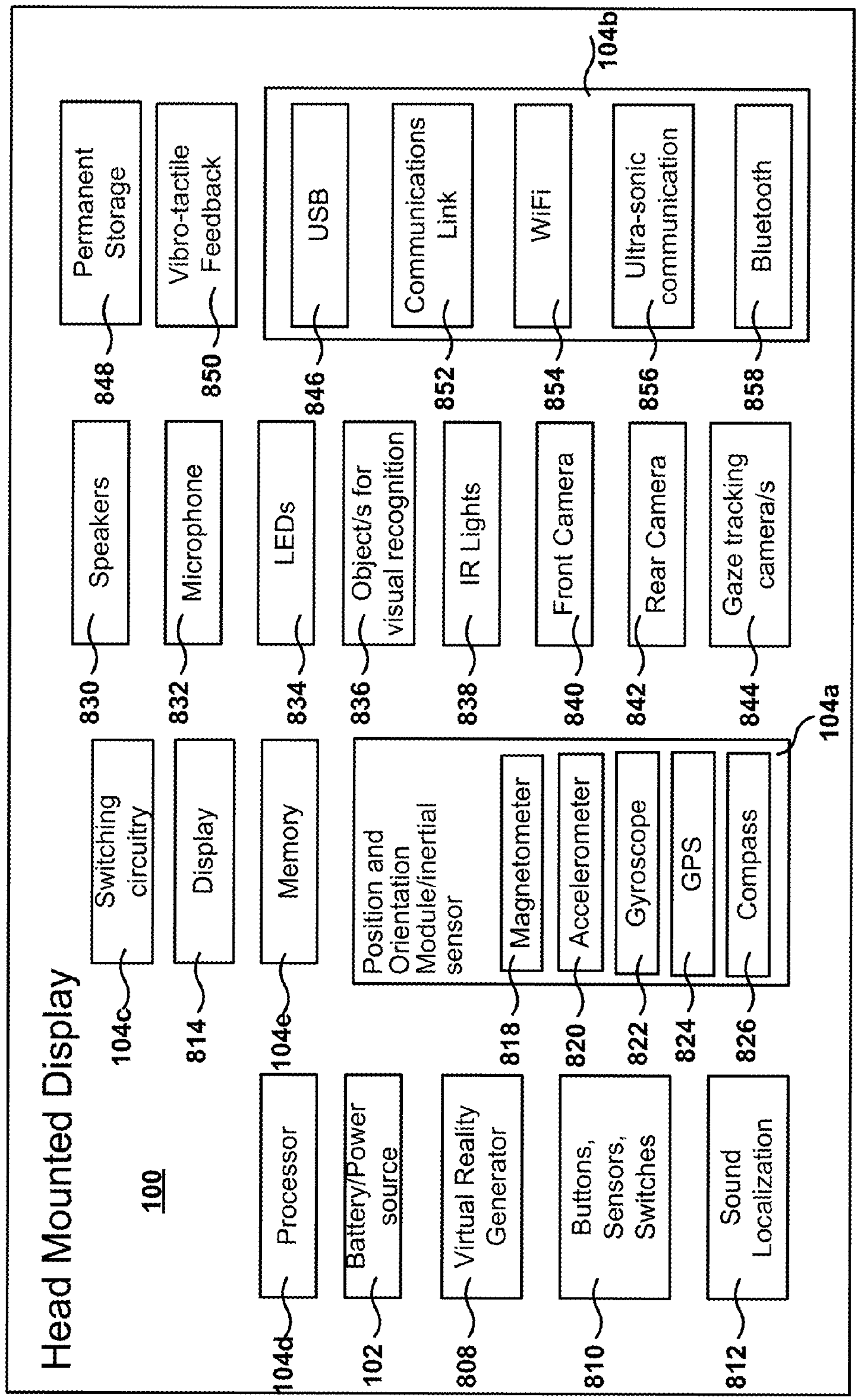
FIG. 7 illustrates the architecture of a device that may be used to implement embodiments of the invention.

FIG. 7 illustrates the architecture of an exemplary head mounted display device 100 that may be used to implement embodiments of the invention. The head mounted display is a computing device and includes modules usually found on a computing device, such as a processor 104*d*, memory 104*e* (RAM, ROM, etc.), one or more batteries or other power sources 102, and permanent storage 104*e* (such as a hard disk).

The communication modules within the communication circuitry 104*b* allow the HMD to exchange information with other portable devices, other computers, other HMD's, servers, etc. The communication modules include a Universal Serial Bus (USB) connector 846, a communications link 852 (such as Ethernet), ultrasonic communication 856, Bluetooth 858, and WiFi 854.

The user interface includes modules for input and output. The input modules include input buttons, sensors and switches 810, microphone 832, touch sensitive screen (not shown, that may be used to configure or initialize the HMD), front camera 840, rear camera 842, gaze tracking cameras 844. Other input/output devices, such as a keyboard or a mouse, can also be connected to the portable device via communications link, such as USB or Bluetooth.

The output modules include the display 814 for rendering images in front of the user's eyes. The display screen is equipped with an enhanced optical system for providing a visual interface for a user to view media content and/or external environment content. Some embodiments may include one display, two displays (one for each eye), micro projectors, or other display technologies. With the one or more display screens, it is possible to provide the video content to only the left-eye, only the right-eye or to both eyes separately. Separate presentation of video content to each eye, for example, can provide for better immersive control of three-dimensional (3D) content. Other output modules include Light-Emitting Diodes (LED) 834, other visual markers or elements (which may also be used for visual tracking of the HMD), vibro-tactile feedback 850, speakers 830, and sound localization module 812, which performs sound localization for sounds to be delivered to speakers or headphones. Other output devices, such as headphones, can also connect to the HMD via the communication modules.

The elements that may be included to facilitate motion tracking include LEDs 834, one or more objects for visual recognition 836, infrared lights 838 or any other visual markers.

Information from different devices can be used by the Position and Orientation Module/inertial sensor module 104*a* to calculate the position of the HMD. These modules include a magnetometer 818 or a compass 826, an accelerometer 820, a gyroscope 822, and a Global Positioning System (GPS) module 824. Additionally, the Position and Orientation Module can analyze sound or image data captured with the cameras and the microphone to calculate the position. The inertial sensors (Accelerometers and Gyroscopes), in one embodiment, provide the orientation data with reference to the HMD and can give relative position data over a short period of time (for e.g., less than a second or some other period of time). The cameras within the HMD together with the external camera(s) may provide absolute position of the HMD. The data from all these modules is fused (sensor fusion) to provide all six degrees of freedom (X, Y, Z, Roll, Pitch and Yaw). Further yet, the Position and Orientation Module can perform tests to determine the position of the portable device or the position of other devices in the vicinity, such as WiFi ping test or ultrasound tests.

A Virtual Reality Generator 808 creates the virtual or augmented reality using the position calculated by the Position Module. The virtual reality generator 808 may cooperate with other computing devices (e.g., game console, Internet server, etc.) to generate images for the display module 814. The remote devices may send screen updates or instructions for creating game objects on the screen.

The foregoing components of HMD 100 are exemplary and should not be considered exhaustive or limiting. Consequently, the HMD may or may not include some of the various aforementioned components. Embodiments of the HMD may additionally include other components not presently described, but known in the art, for purposes of facilitating aspects of the present invention as herein described.

Figure 8:
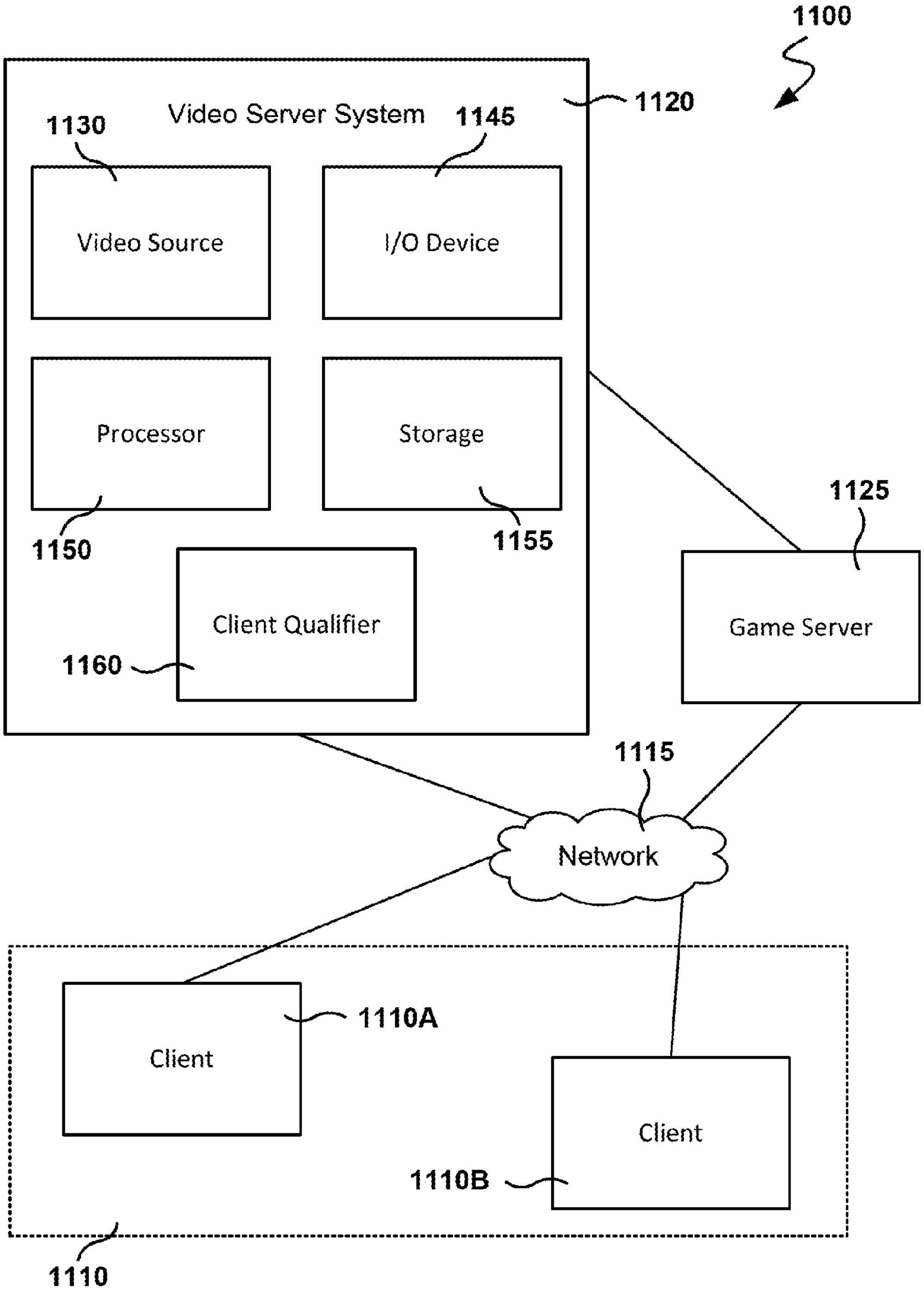
FIG. 8 is a block diagram of a game system, according to various embodiments of the invention.

FIG. 8 is a block diagram of a Game System 1100, according to various embodiments of the invention. It should be noted that the Game System is exemplary and other types of systems may also use the enhanced optical system defined in the HMD for presenting content/real-world objects. Game System 1100 is configured to provide a video stream to one or more Clients 1110 via a Network 1115. Game System 1100 typically includes a Video Server System 1120 and an optional game server 1125. Video Server System 1120 is configured to provide the video stream to the one or more Clients 1110 with a minimal quality of service. For example, Video Server System 1120 may receive a game command that changes the state of or a point of view within a video game, and provide Clients 1110 with an updated video stream reflecting this change in state with minimal lag time. The Video Server System 1120 may be configured to provide the video stream in a wide variety of alternative video formats.

Clients 1110, referred to herein individually as 1110A, 1110B, etc., may include head mounted displays, terminals, personal computers, game consoles, tablet computers, telephones, set top boxes, kiosks, wireless devices, digital pads, stand-alone devices, handheld game playing devices, and/or the like. Typically, Clients 1110 are configured to receive encoded video streams, decode the video streams, and present the resulting video to a user, e.g., a player of a game. The processes of receiving encoded video streams and/or decoding the video streams typically includes storing individual video frames in a receive buffer of the client. The video streams may be presented to the user on a display integral to Client 1110, such as a display screen of a HMD device, or on a separate device such as a monitor or television. Clients 1110 are optionally configured to support more than one game player. For example, a game console may be configured to support two, three, four or more simultaneous players. Each of these players may receive a separate video stream, or a single video stream may include regions of a frame generated specifically for each player, e.g., generated based on each player's point of view. Clients 1110 are optionally geographically dispersed. The number of clients included in Game System 1100 may vary widely from one or two to thousands, tens of thousands, or more. As used herein, the term "game player" is used to refer to a person that plays a game and the term "game playing device" is used to refer to a device used to play a game. In some embodiments, the game playing device may refer to a plurality of computing devices that cooperate to deliver a game experience to the user. For example, a game console and an HMD may cooperate with the video server system 1120 to deliver a game viewed through the HMD. In one embodiment, the game console receives the video stream from the video server system 1120, and the game console forwards the video stream, or updates to the video stream, to the HMD for rendering.

Clients 1110 are configured to receive video streams via Network 1115. Network 1115 may be any type of communication network including, a telephone network, the Internet, wireless networks, powerline networks, local area networks, wide area networks, private networks, and/or the like. In typical embodiments, the video streams are communicated via standard protocols, such as TCP/IP or UDP/IP. Alternatively, the video streams are communicated via proprietary standards.

A typical example of Clients 1110 is a personal computer comprising a processor, non-volatile memory, a display, decoding logic, network communication capabilities, and input devices. The decoding logic may include hardware, firmware, and/or software stored on a computer readable medium. Systems for decoding (and encoding) video streams are well known in the art and vary depending on the particular encoding scheme used.

Clients 1110 may, but are not required to, further include systems configured for modifying received video. For example, a client may be configured to perform further rendering, to overlay one video image on another video image, to crop a video image, and/or the like. For example, Clients 1110 may be configured to receive various types of video frames, such as I-frames, P-frames and B-frames, and to process these frames into images for display to a user. In some embodiments, a member of Clients 1110 is configured to perform further rendering, shading, conversion to 3-D, optical distortion processing for HMD optics, or like operations on the video stream. A member of Clients 1110 is optionally configured to receive more than one audio or video stream. Input devices of Clients 1110 may include, for example, a one-hand game controller, a two-hand game controller, a gesture recognition system, a gaze recognition system, a voice recognition system, a keyboard, a joystick, a pointing device, a force feedback device, a motion and/or location sensing device, a mouse, a touch screen, a neural interface, a camera, input devices yet to be developed, and/or the like.

The video stream (and optionally audio stream) received by Clients 1110 is generated and provided by Video Server System 1120. As is described further elsewhere herein, this video stream includes video frames (and the audio stream includes audio frames). The video frames are configured (e.g., they include pixel information in an appropriate data structure) to contribute meaningfully to the images displayed to the user. As used herein, the term "video frames" is used to refer to frames including predominantly information that is configured to contribute to, e.g. to effect, the images shown to the user. Most of the teachings herein with regard to "video frames" can also be applied to "audio frames."

Clients 1110 are typically configured to receive inputs from a user. These inputs may include game commands configured to change the state of the video game or otherwise affect game play. The game commands can be received using input devices and/or may be automatically generated by computing instructions executing on Clients 1110. The received game commands are communicated from Clients 1110 via Network 1115 to Video Server System 1120 and/or Game Server 1125. For example, in some embodiments, the game commands are communicated to Game Server 1125 via Video Server System 1120. In some embodiments, separate copies of the game commands are communicated from Clients 1110 to Game Server 1125 and Video Server System 1120. The communication of game commands is optionally dependent on the identity of the command. Game commands are optionally communicated from Client 1110A through a different route or communication channel that that used to provide audio or video streams to Client 1110A.

Game Server 1125 is optionally operated by a different entity than Video Server System 1120. For example, Game Server 1125 may be operated by the publisher of a multiplayer game. In this example, Video Server System 1120 is optionally viewed as a client by Game Server 1125 and optionally configured to appear from the point of view of Game Server 1125 to be a prior art client executing a prior art game engine. Communication between Video Server System 1120 and Game Server 1125 optionally occurs via Network 1115. As such, Game Server 1125 can be a prior art multiplayer game server that sends game state information to multiple clients, one of which is game server system 1120. Video Server System 1120 may be configured to communicate with multiple instances of Game Server 1125 at the same time. For example, Video Server System 1120 can be configured to provide a plurality of different video games to different users. Each of these different video games may be supported by a different Game Server 1125 and/or published by different entities. In some embodiments, several geographically distributed instances of Video Server System 1120 are configured to provide game video to a plurality of different users. Each of these instances of Video Server System 1120 may be in communication with the same instance of Game Server 1125. Communication between Video Server System 1120 and one or more Game Server 1125 optionally occurs via a dedicated communication channel. For example, Video Server System 1120 may be connected to Game Server 1125 via a high bandwidth channel that is dedicated to communication between these two systems.

Video Server System 1120 comprises at least a Video Source 1130, an I/O Device 1145, a Processor 1150, and non-transitory Storage 1155. Video Server System 1120 may include one computing device or be distributed among a plurality of computing devices. These computing devices are optionally connected via a communications system such as a local area network.

Video Source 1130 is configured to provide a video stream, e.g., streaming video or a series of video frames that form a moving picture. In some embodiments, Video Source 1130 includes a video game engine and rendering logic. The video game engine is configured to receive game commands from a player and to maintain a copy of the state of the video game based on the received commands. This game state includes the position of objects in a game environment, as well as typically a point of view. The game state may also include properties, images, colors and/or textures of objects. The game state is typically maintained based on game rules, as well as game commands such as move, turn, attack, set focus to, interact, use, and/or the like. Part of the game engine is optionally disposed within Game Server 1125. Game Server 1125 may maintain a copy of the state of the game based on game commands received from multiple players using geographically disperse clients. In these cases, the game state is provided by Game Server 1125 to Video Source 1130, wherein a copy of the game state is stored and rendering is performed. Game Server 1125 may receive game commands directly from Clients 1110 via Network 1115, and/or may receive game commands via Video Server System 1120.

Video Source 1130 typically includes rendering logic, e.g., hardware, firmware, and/or software stored on a computer readable medium such as Storage 1155. This rendering logic is configured to create video frames of the video stream based on the game state. All or part of the rendering logic is optionally disposed within a graphics processing unit (GPU). Rendering logic typically includes processing stages configured for determining the three-dimensional spatial relationships between objects and/or for applying appropriate textures, etc., based on the game state and viewpoint. The rendering logic produces raw video that is then usually encoded prior to communication to Clients 1110. For example, the raw video may be encoded according to an Adobe Flash® standard, .wav, H.264, H.263, On2, VP6, VC-1, WMA, Huffyuv, Lagarith, MPG-x. Xvid. FFmpeg, x264, VP6-8, realvideo, mp3, or the like. The encoding process produces a video stream that is optionally packaged for delivery to a decoder on a remote device. The video stream is characterized by a frame size and a frame rate. Typical frame sizes include 800×600, 1280×720 (e.g., 720p), 1024×768, although any other frame sizes may be used. The frame rate is the number of video frames per second. A video stream may include different types of video frames. For example, the H.264 standard includes a "P" frame and a "I" frame. I-frames include information to refresh all macro blocks/pixels on a display device, while P-frames include information to refresh a subset thereof. P-frames are typically smaller in data size than are I-frames. As used herein the term "frame size" is meant to refer to a number of pixels within a frame. The term "frame data size" is used to refer to a number of bytes required to store the frame.

In alternative embodiments Video Source 1130 includes a video recording device such as a camera. This camera may be used to generate delayed or live video that can be included in the video stream of a computer game. The resulting video stream, optionally includes both rendered images and images recorded using a still or video camera. Video Source 1130 may also include storage devices configured to store previously recorded video to be included in a video stream. Video Source 1130 may also include motion or positioning sensing devices configured to detect motion or position of an object, e.g., person, and logic configured to determine a game state or produce video-based on the detected motion and/or position.

Video Source 1130 is optionally configured to provide overlays configured to be placed on other video. For example, these overlays may include a command interface, log in instructions, messages to a game player, images of other game players, video feeds of other game players (e.g., webcam video). In embodiments of Client 1110A including a touch screen interface or a gaze detection interface, the overlay may include a virtual keyboard, joystick, touch pad, and/or the like. In one example of an overlay a player's voice is overlaid on an audio stream. Video Source 1130 optionally further includes one or more audio sources.

In embodiments wherein Video Server System 1120 is configured to maintain the game state based on input from more than one player, each player may have a different point of view comprising a position and direction of view. Video Source 1130 is optionally configured to provide a separate video stream for each player based on their point of view. Further, Video Source 1130 may be configured to provide a different frame size, frame data size, and/or encoding to each of Client 1110. Video Source 1130 is optionally configured to provide 3-D video.

I/O Device 1145 is configured for Video Server System 1120 to send and/or receive information such as video, commands, requests for information, a game state, gaze information, device motion, device location, user motion, client identities, player identities, game commands, security information, audio, and/or the like. I/O Device 1145 typically includes communication hardware such as a network card or modem. I/O Device 1145 is configured to communicate with Game Server 1125, Network 1115, and/or Clients 1110.

Processor 1150 is configured to execute logic, e.g. software, included within the various components of Video Server System 1120 discussed herein. For example, Processor 1150 may be programmed with software instructions in order to perform the functions of Video Source 1130, Game Server 1125, and/or a Client Qualifier 1160. Video Server System 1120 optionally includes more than one instance of Processor 1150. Processor 1150 may also be programmed with software instructions in order to execute commands received by Video Server System 1120, or to coordinate the operation of the various elements of Game System 1100 discussed herein. Processor 1150 may include one or more hardware device. Processor 1150 is an electronic processor.

Storage 1155 includes non-transitory analog and/or digital storage devices. For example, Storage 1155 may include an analog storage device configured to store video frames. Storage 1155 may include a computer readable digital storage, e.g. a hard drive, an optical drive, or solid state storage. Storage 1115 is configured (e.g. by way of an appropriate data structure or file system) to store video frames, artificial frames, a video stream including both video frames and artificial frames, audio frame, an audio stream, and/or the like. Storage 1155 is optionally distributed among a plurality of devices. In some embodiments, Storage 1155 is configured to store the software components of Video Source 1130 discussed elsewhere herein. These components may be stored in a format ready to be provisioned when needed.

Video Server System 1120 optionally further comprises Client Qualifier 1160. Client Qualifier 1160 is configured for remotely determining the capabilities of a client, such as Clients 1110A or 1110B. These capabilities can include both the capabilities of Client 1110A itself as well as the capabilities of one or more communication channels between Client 1110A and Video Server System 1120. For example, Client Qualifier 1160 may be configured to test a communication channel through Network 1115.

Client Qualifier 1160 can determine (e.g., discover) the capabilities of Client 1110A manually or automatically. Manual determination includes communicating with a user of Client 1110A and asking the user to provide capabilities. For example, in some embodiments, Client Qualifier 1160 is configured to display images, text, and/or the like within a browser of Client 1110A. In one embodiment, Client 1110A is an HMD that includes a browser. In another embodiment, client 1110A is a game console having a browser, which may be displayed on the HMD. The displayed objects request that the user enter information such as operating system, processor, video decoder type, type of network connection, display resolution, etc. of Client 1110A. The information entered by the user is communicated back to Client Qualifier 1160.

Automatic determination may occur, for example, by execution of an agent on Client 1110A and/or by sending test video to Client 1110A. The agent may comprise computing instructions, such as java script, embedded in a web page or installed as an add-on. The agent is optionally provided by Client Qualifier 1160. In various embodiments, the agent can find out processing power of Client 1110A, decoding and display capabilities of Client 1110A, lag time reliability and bandwidth of communication channels between Client 1110A and Video Server System 1120, a display type of Client 1110A, firewalls present on Client 1110A, hardware of Client 1110A, software executing on Client 1110A, registry entries within Client 1110A, and/or the like.

Client Qualifier 1160 includes hardware, firmware, and/or software stored on a computer readable medium. Client Qualifier 1160 is optionally disposed on a computing device separate from one or more other elements of Video Server System 1120. For example, in some embodiments, Client Qualifier 1160 is configured to determine the characteristics of communication channels between Clients 1110 and more than one instance of Video Server System 1120. In these embodiments the information discovered by Client Qualifier can be used to determine which instance of Video Server System 1120 is best suited for delivery of streaming video to one of Clients 1110.

Embodiments of the present invention may be practiced with various computer system configurations including hand-held devices, microprocessor systems, microprocessor-based or programmable consumer electronics, minicomputers, mainframe computers and the like. The invention can also be practiced in distributed computing environments where tasks are performed by remote processing devices that are linked through a wire-based or wireless network.

With the above embodiments in mind, it should be understood that the invention can employ various computer-implemented operations involving data stored in computer systems. These operations are those requiring physical manipulation of physical quantities. Any of the operations described herein that form part of the invention are useful machine operations. The invention also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A device, comprising:

a display screen for rendering frames of media content thereon, the display screen having a front side and a back side, the display screen being transparent, wherein each frame that is rendered is defined by a frame size having a defined number of pixels;

first optics disposed adjacent to the front side of the display screen, the first optics includes a lens that is configured to focus the frames of media content at a predetermined distance when viewed by eyes of a user wearing the device;

a shutter screen disposed adjacent to the backside of the display screen, wherein different portions of the shutter screen are selectively switchable between an opaque mode and a transparent mode and wherein the opaque mode is active in portions of the shutter screen for enabling the media content rendered on corresponding portions of the display screen to be viewable, and the media content is not viewable in portions of the display screen that corresponds with the portions of the shutter screen where the transparent mode is active;

second optics disposed behind the shutter screen such that the shutter screen is between the back side of the display screen and the second optics, the second optics includes a lens that is configured to provide a correction so that a distortion caused by the first optics is canceled out by the second optics, the correction allows viewing of external environment in vicinity of the device through the first optics, the display screen, the shutter screen and the second optics when the transparent mode is activated on the shutter screen; and a circuit logic configured to receive signals from one or more sensors distributed on the device and analyze the signals to determine a change in environmental condition in a vicinity of a user of the device, the change in environmental condition prompting a portion defined by a location on the shutter screen to transition from the opaque mode to the transparent mode, the portion being less than an entire portion of the shutter screen.

2. The device of claim 1, wherein the adjustment provided in the second optics is to compensate for view distortion caused by the focus of the first optics.

3. The device of claim 1, wherein the shutter screen is configured to allow the transparent mode to be activated on the portion of the shutter screen and the opaque mode to be activated for remaining portions of the shutter screen.

4. The device of claim 3, wherein the activation of the transparent mode in the portion of the shutter screen causes a viewport to be defined through the portion of the shutter screen to provide a view to the external environment in the vicinity of the device through corresponding portions of the first optics, the display screen and the second optics.

5. The device of claim 3, wherein the activation of the transparent mode in the portion of the shutter screen causes activation of a window in the portion of the display screen that corresponds to at least one of the remaining portions of the shutter screen that is in opaque mode, the window rendering a view of a web portal at a web site and options to interact with the web portal.

6. The device of claim 1, further includes a switching circuit that is communicatively connected to the shutter screen to activate the transparent mode or the opaque mode in specific portions of the shutter screen; and a microprocessor communicatively connected to the switching circuit to control the switching of the portion of the shutter screen to the transparent mode, wherein the microprocessor is configured to process the media content by formatting the media content, such that the media content is provided for rendering in a portion of the display screen that corresponds with remaining portion of the shutter screen that is in opaque mode.

7. The device of claim 1, further includes an event detector circuit configured to generate a signal for selectively switching the portion of the shutter screen to transparent mode, in response to detection of an event occurring within the media content.

8. The device of claim 7, wherein the event detected is one of a change in media content being rendered, change in environment condition within the media content, an audio signal generated in the media content, or any combinations thereof, and wherein the change in environment condition detected by the circuit logic is one of a change in an external environment condition in vicinity of the device, an audio signal detected in the vicinity of the device, a visual cue detected in the vicinity of the user wearing the device, or any combinations thereof.

9. The device of claim 8, wherein the change in the external environment condition corresponds to movement of an object in the external environment in vicinity of the device, in response to the change in the external environment condition, the event detector circuit is configured to track movement of the object and generate appropriate signals to cause selective switching of different portions of the shutter screen that correspond with the movement of the object, to transparent mode to permit viewing of the moving object.

10. The device of claim 1, further includes input device configured for user interaction, wherein the user interaction includes providing annotation on an object provided in the media content or on an object from an external environment, interaction with the media content or the object, blending of the object into the media content or any combinations thereof.

11. The device of claim 1, wherein each of the first optic, the display screen, the shutter screen and the second optic is coated with an anti-reflective coating, wherein an amount of anti-reflective coating on each of the first optic, the display screen, the shutter screen and the second optic is adjusted to optimize viewing efficiency of the display screen.

12. The device of claim 1, wherein the display screen rendering the multimedia content thereon is disposed in front of the eyes of a user and is spaced apart from the eyes of the user, when the device is worn by the user, pixels from video frames of the media content are rendered in portions of the display screen that correspond to portions of the shutter screen that are in opaque mode.

13. A pair of glasses used for viewing content, comprising, a view port provided with a multi-layer arrangement, the multi-layer arrangement includes, a first optic including lens configured with a first focus setting to focus frames of media content at a predetermined distance when rendered on a display screen of the pair of glasses worn by a user so as to allow eyes of the user to view the frames of media content;

the display screen rendering the frames of media content thereon is positioned behind the first optic, the display screen being transparent, wherein each frame that is rendered is defined by a frame size having a defined number of pixels;

a shutter screen positioned behind the display screen, wherein different portions of the shutter screen being selectively adjustable between a transparent mode and an opaque mode, wherein media content is provided for rendering so as to be viewable in portions of the display screen that correspond with portions of the shutter screen where the opaque mode is activated and is not provided for rendering in portions of the display screen that correspond with portions of the shutter screen where the transparent mode is activated; and a second optic including lens configured with a second focus setting, the second focus setting used for adjusting any view distortion caused by the first focus setting of the first optic, to provide a focused see through view of external environment in vicinity of the pair of glasses through the first optic, the display screen, the shutter screen and the second optic, when a specific portion of the shutter screen is set to the transparent mode; and a micro processor configured to process the media content, based on a change detected in environmental condition, the processing includes activating the transparent mode in the specific portion of the shutter screen and formatting the media content for rendering in a portion of the display screen that corresponds with remaining portion of the shutter screen that is in opaque mode, wherein the specific portion being less than an entire portion of the shutter screen.

14. The pair of glasses of claim 13, further includes a switching circuit communicatively connected to the shutter screen and configured to activate the transparent mode or the opaque mode; and the micro processor connected to the switching circuit to control switching of the specific portion of the shutter screen to the transparent mode from the opaque mode.

15. The pair of glasses of claim 13, wherein adjusting any view distortion caused by the first focus setting is by configuring the second focus setting of the second optic to compensate for any view distortion caused by the first focus setting, when viewing through the pair of glasses.

16. The pair of glasses of claim 13, wherein the first optic, the display screen, the shutter screen and the second optic are each coated with anti-reflective coating, a thickness of the anti-reflective coating on each of the first optic, the display screen, the shutter screen and the second optic adjusted to optimize viewing efficiency of the display screen.

17. A method, comprising:

receiving frames of media content for rendering on a display screen of a pair of glasses worn by a user, the pair of glasses including first optics disposed in front of the display screen, the first optics including lens configured to focus the frames of media content at a predetermined distance when rendered on the display screen to allow eyes of the user to view the frames of media content, configured to wherein each frame of the media content is defined by a frame size with a defined number of pixels;

detecting an event trigger generated while the media content is being rendered, the detection causing a signal to be generated, wherein the signal prompts adjustment to a format of the media content transmitted for rendering; and in response to the generated signal, activating a transparent mode for a portion of a shutter screen in the pair of glasses that is disposed behind the display screen, the activation resulting in the media content from not being rendered in a portion of the display screen corresponding to the portion of the shutter screen where the transparent mode is activated to enable a view to an external environment in vicinity of the pair of glasses, while remaining portions of the shutter screen is maintained in an opaque mode to enable viewing of the images of the frames of media content that is formatted to be rendered on corresponding portions of the display screen, the viewing of the external environment discernible through second optics within the pair of glasses that are disposed behind the shutter screen, the second optics having lens that is configured to provide a second focus that compensates for view distortion caused by the focus of the first optics, wherein the method is executed by a processor.

18. The method of claim 17, wherein the event trigger is caused by a change in condition within the media content, or a change in external environment condition near the pair of glasses, or actions of a user wearing the pair of glasses, or actions of one or more users near the user wearing the pair of glasses, or an audio signal detected in vicinity of the device, or a specific audio signal generated in the media content, or a visual cue detected in the vicinity of the pair of glasses, or any combinations thereof.

19. The method of claim 18, further includes, determining a cause of the event trigger;

when the event trigger is caused by a change in external environment conditions, tracking the change in external environment condition and generating signals to activate transparent mode in specific portions of the shutter screen that correspond to the change.

20. The method of claim 17, wherein the event trigger is caused in response to detecting proximity of a user wearing the pair of glasses to a physical object in the external environment that is part of a real-world environment.

21. The method of claim 17, wherein the signal is indicative of a safety warning and is provided as one of an audio signal, or a haptic signal, or a message on the display screen of the pair of glasses.

* * * * *